US011888267B2

(12) United States Patent
Little et al.

(10) Patent No.: US 11,888,267 B2
(45) Date of Patent: Jan. 30, 2024

(54) ELECTRICAL CONNECTOR ASSEMBLY INCLUDING MATABLE BOARD CONNECTOR AND CABLE CONNECTOR WITH IMPROVED GROUNDING BAR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Neng Xiao, Irvine, CA (US); Haozhe Zi, Irvine, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 269 days.

(21) Appl. No.: 17/460,602

(22) Filed: Aug. 30, 2021

(65) Prior Publication Data

US 2022/0029360 A1 Jan. 27, 2022

Related U.S. Application Data

(63) Continuation-in-part of application No. 17/212,180, filed on Mar. 25, 2021, now Pat. No. 11,682,852.

(Continued)

(51) Int. Cl.

*H01R 12/71* (2011.01)
*H01R 13/627* (2006.01)

(Continued)

(52) U.S. Cl.

CPC ....... *H01R 13/6582* (2013.01); *H01R 12/716* (2013.01); *H01R 13/40* (2013.01);

(Continued)

(58) Field of Classification Search

CPC .... H01R 12/71; H01R 12/712; H01R 12/716; H01R 4/023; H01R 4/024; H01R 13/6272;

(Continued)

(56) References Cited

U.S. PATENT DOCUMENTS

| | | | | |
|---|---|---|---|---|
| 11,211,743 | B2 * | 12/2021 | Briant | H01R 13/6591 |
| 11,489,293 | B2 * | 11/2022 | Balakrishnan | H01R 12/721 |

(Continued)

FOREIGN PATENT DOCUMENTS

| | | |
|---|---|---|
| CN | 202601879 U | 12/2012 |
| CN | 104852187 A | 8/2015 |

(Continued)

*Primary Examiner* — Khiem M Nguyen

(74) *Attorney, Agent, or Firm* — Ming Chieh Chang

(57) ABSTRACT

A cable connector includes a contact module, wires and grounding bars. The contact module includes a pair of subunits commonly sandwiching a metallic shielding plate. Each subunit includes contacts integrally formed within an insulator, the contacts includes a plurality of differential-pair contacts and grounding contacts alternately arranged with each other. Each contact includes a front contacting section and a rear tail section, the tail sections of the grounding contacts being unified with a transverse bar. Each wire has a pair of inner conductors respectively soldered to the tail sections of the corresponding differential-pair contacts, and an outer braiding layer surrounding the pair of inner conductors and mechanically and electrically connected to the transverse bar. Each grounding bar includes a plurality of rear tabs respectively connected to the braiding layers, and (Continued)

a plurality of front tabs respectively connected to the tail sections of the corresponding grounding contacts.

8 Claims, 52 Drawing Sheets

Related U.S. Application Data

(60) Provisional application No. 63/120,168, filed on Dec. 1, 2020, provisional application No. 63/073,084, filed on Sep. 1, 2020, provisional application No. 63/041,921, filed on Jun. 21, 2020, provisional application No. 63/004,068, filed on Apr. 2, 2020.

(51) Int. Cl.

| | |
|---|---|
| ***H01R 13/6582*** | (2011.01) |
| ***H01R 13/639*** | (2006.01) |
| ***H01R 13/40*** | (2006.01) |
| ***H01R 13/516*** | (2006.01) |

(52) U.S. Cl.
CPC ....... *H01R 13/516* (2013.01); *H01R 13/6271* (2013.01); *H01R 13/639* (2013.01)

(58) Field of Classification Search
CPC ............ H01R 13/6471; H01R 13/6585; H01R 13/6582; H01R 13/6271; H01R 13/639; H01R 13/516; H01R 13/40
USPC ...................................................... 439/607.01
See application file for complete search history.

(56) References Cited

U.S. PATENT DOCUMENTS

| | | | |
|---|---|---|---|
| 2019/0245288 | A1 | 8/2019 | Lloyd et al. |
| 2020/0083627 | A1 | 3/2020 | Peloza et al. |
| 2020/0358227 | A1 | 11/2020 | Henry et al. |
| 2020/0366017 | A1 | 11/2020 | Blackburn et al. |

FOREIGN PATENT DOCUMENTS

| | | | |
|---|---|---|---|
| TW | 456622 | U | 9/2001 |
| TW | 354928 | U | 4/2009 |
| TW | 379193 | U | 4/2010 |
| TW | 382628 | U | 6/2010 |

* cited by examiner

ELECTRICAL CONNECTOR ASSEMBLY INCLUDING MATABLE BOARD CONNECTOR AND CABLE CONNECTOR WITH IMPROVED GROUNDING BAR

CROSS REFERENCE TO RELATED APPLICATIONS

This application is a continuation-in-part of co-pending application Ser. No. 17/212,180 filed Mar. 25, 2021, and the instant application further claims the benefit of, and priority to, U.S. Provisional Patent Application Nos. 63/073,084, filed on Sep. 1, 2020, and 63/120,168 filed on Dec. 1, 2020, the contents of which are incorporated entirely herein by reference.

BACKGROUND OF THE INVENTION

1. Field of the Invention

The present invention relates generally to an electrical connector assembly having the mated cable connector and board connector each equipped with grounding bar and/or shielding plate.

2. Description of Related Arts

Existing electrical connectors include a plug connector linked with cable wires and a receptacle connector mounted upon a printed circuit board wherein the plug connector uses a paddle card for connecting to the receptacle connector and linked with the wires. Notably, using the paddle card inevitably increases a length/height of the plug connector.

Hence, an electrical connector with lower profile configuration is desired.

SUMMARY OF THE INVENTION

A cable connector comprises: a contact module received within a receiving space defined by a pair of covers, the contact module comprising a pair of subunits commonly sandwiching a metallic shielding plate therebetween in a transverse direction; each subunit comprising a plurality of contacts integrally formed within an insulator, the contacts including a plurality of differential-pair contacts and grounding contacts alternately arranged with each other in a longitudinal direction perpendicular to the transverse direction, each contact comprising a front contacting section and a rear tail section along a mating direction perpendicular to both the transverse direction and the longitudinal direction, the tail sections of the grounding contacts being unified with a transverse bar; a plurality of wires each having a pair of inner conductors respectively soldered to the tail sections of the corresponding differential-pair contacts, and an outer braiding layer surrounding the pair of inner conductors and mechanically and electrically connected to the transverse bar; and a pair of grounding bars positioned upon the corresponding subunits, respectively, each grounding bar including a plurality of rear tabs respectively connected to the braiding layers, and a plurality of front tabs respectively connected to the tail sections of the corresponding grounding contacts.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1A:
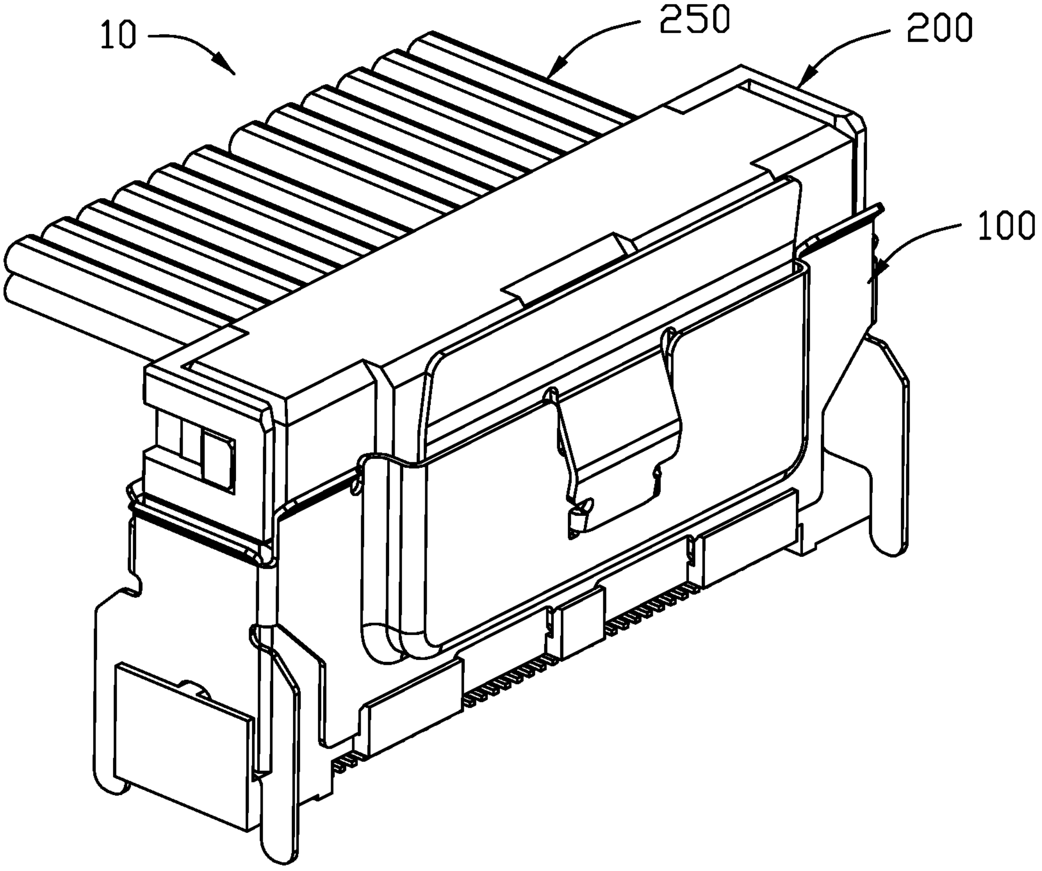
FIG. 1(A) is a perspective view of an electrical connector assembly including mated plug connector and receptacle connector according to a first embodiment of the invention.
Figure 1B:
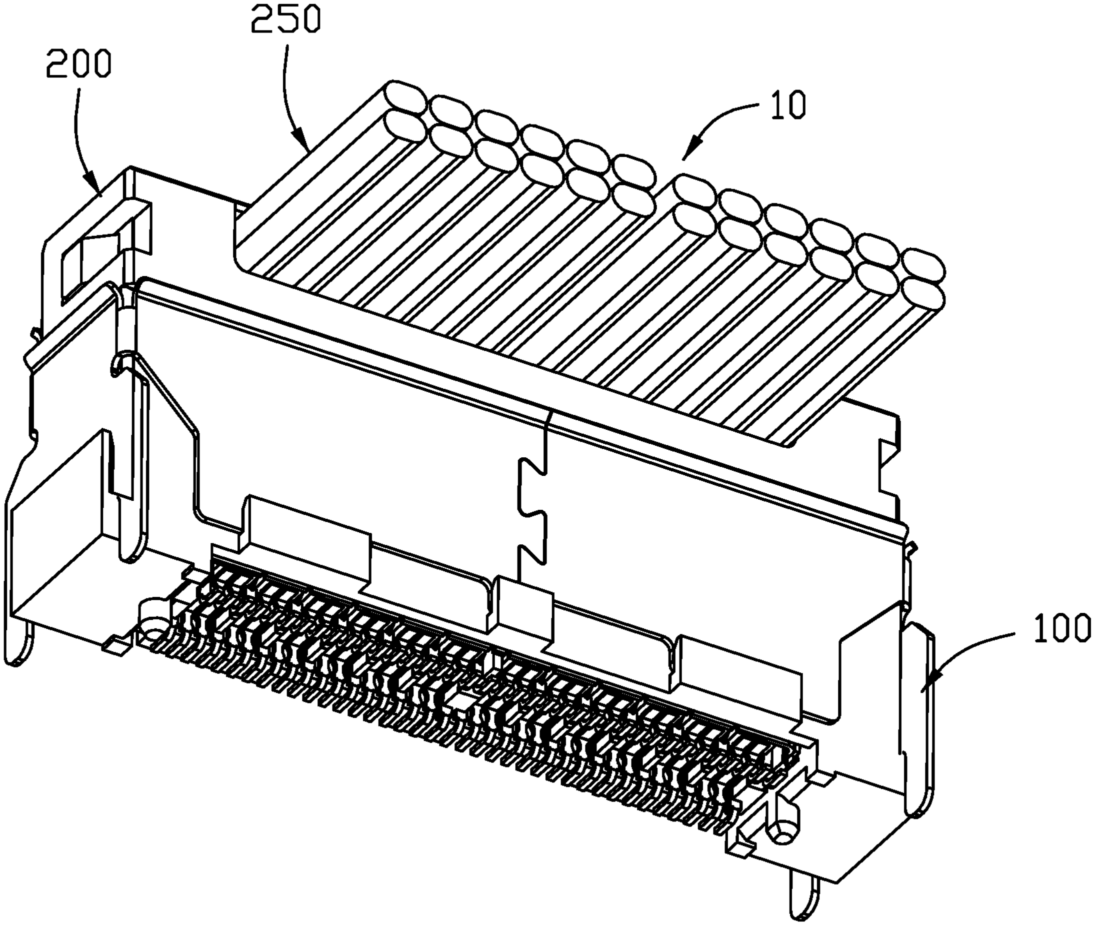
FIG. 1(B) is another perspective view of the electrical connector assembly of FIG. 1(A)
Figure 2A:
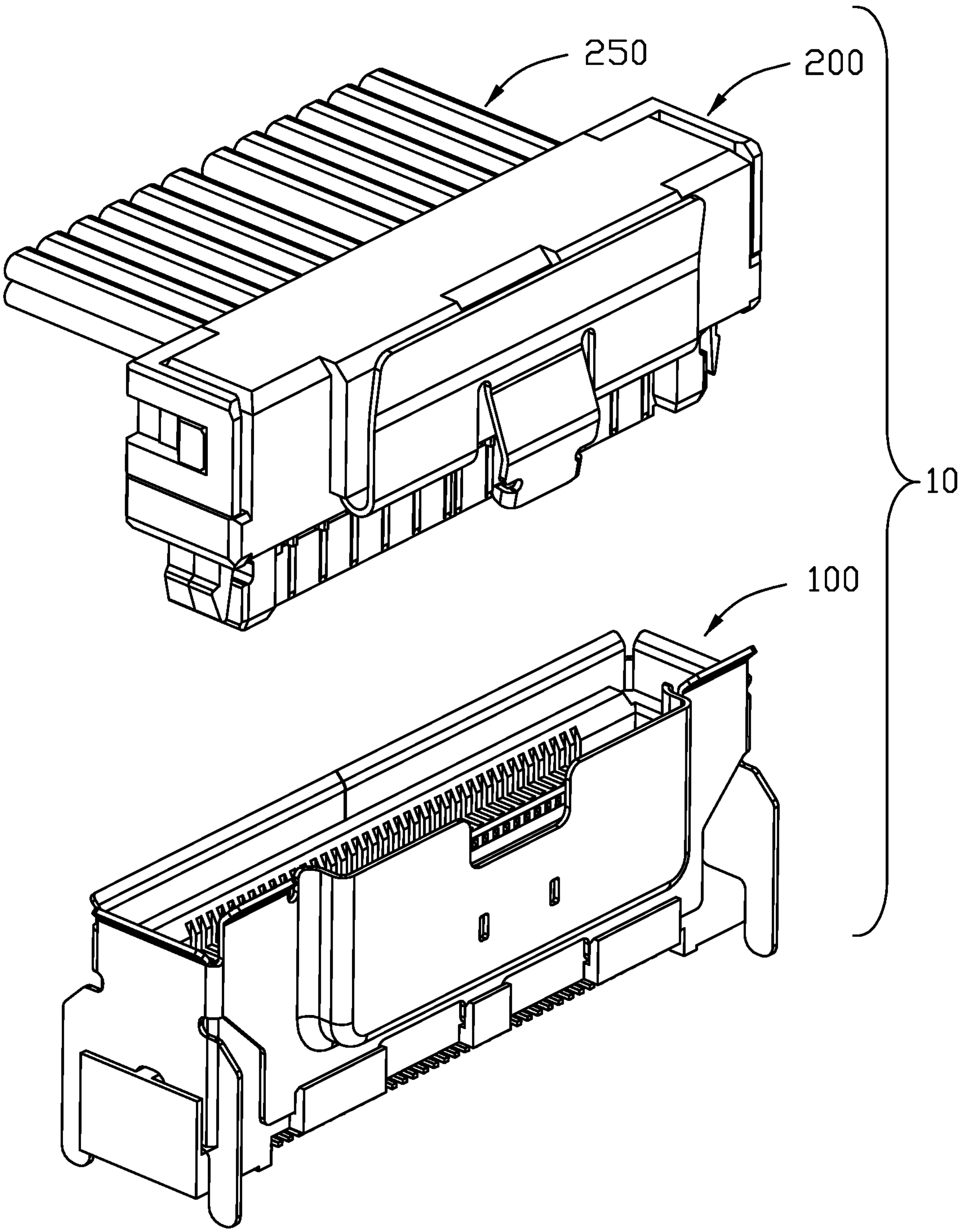
FIG. 2(A) is a perspective view of the electrical connector assembly of FIG. 1 wherein the plug connector and the receptacle connector are separated from each other.
Figure 2B:
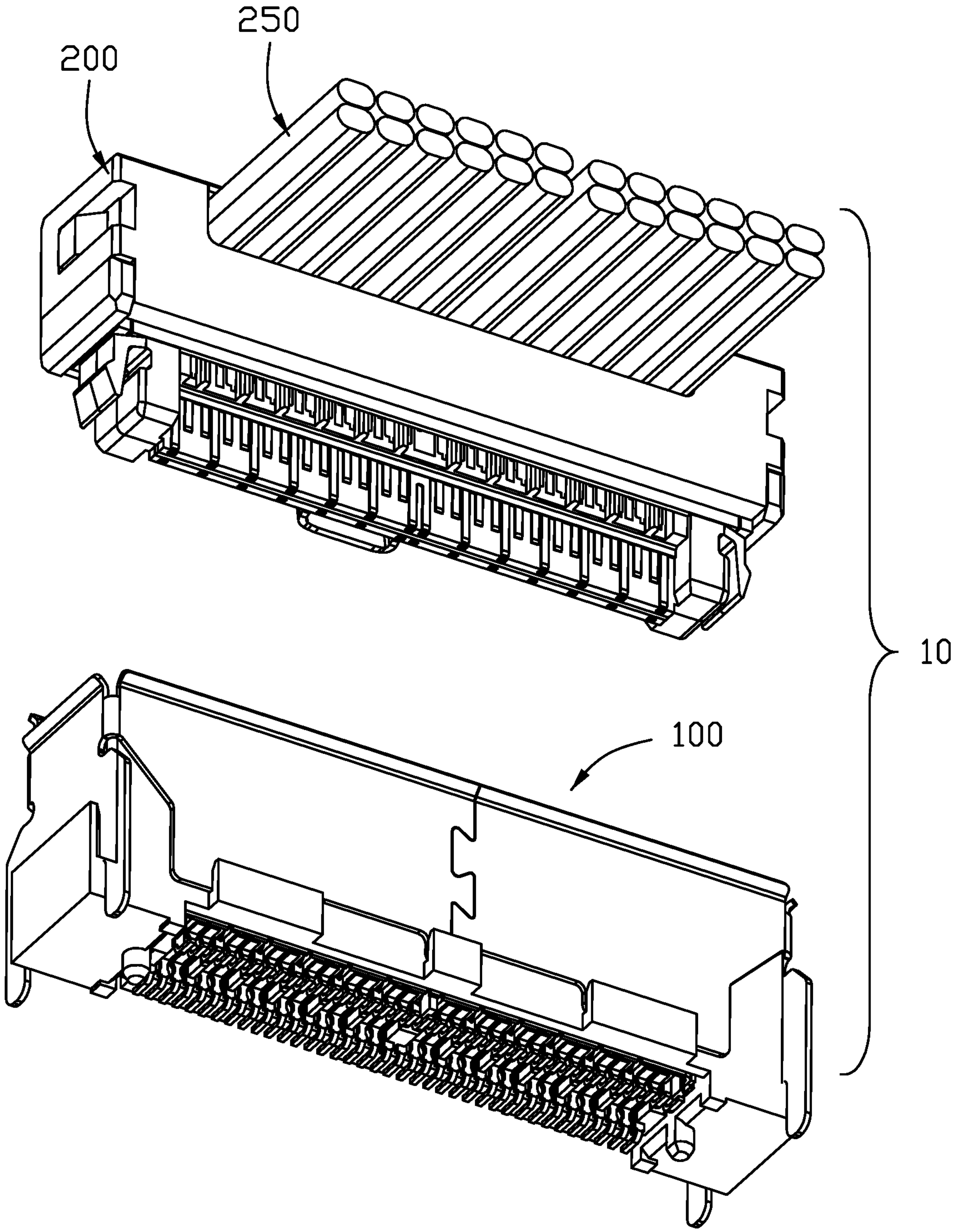
FIG. 2(B) is another perspective view of the electrical connector assembly of FIG. 2(A)
Figure 3:
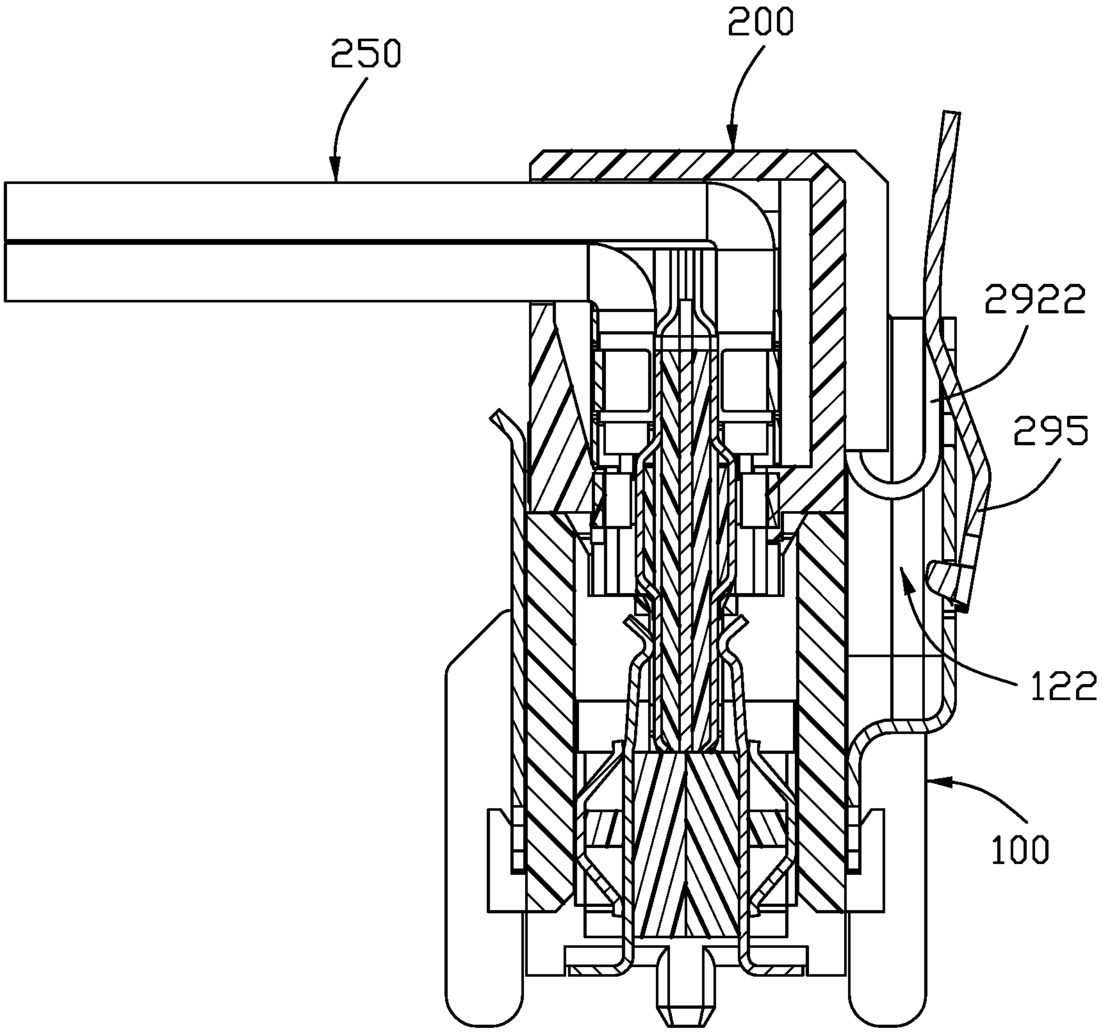
FIG. 3 is a cross-sectional view of the electrical connector assembly of FIG. 1(A)

Reference will now be made in detail to the preferred embodiment of the present invention.

Referring to FIGS. 1-14(B) illustrating a first embodiment of the present invention, an electrical connector assembly 10 includes a plug/cable connector 200, which is equipped with a plurality of wires 250, and a receptacle/board connector 100 which is adapted to be mounted upon a printed circuit board (PCB, not shown). In this embodiment, the plug connector 200 and the receptacle connector are mated with each other in a vertical/mating direction.

The plug connector 200 includes a contact module 210 enclosed within a receiving space 283 defined by a pair of covers 280 and 282. The cover 280 forms a pair of slots 285 to receive the corresponding protrusions 286 of the cover 282. The cover 280 further forms an opening 281 to allow wires 250 to extend therethrough. The latch 290 includes an operation section 294 from which a pair of retaining arms 292 and a locking arm 295 between the pair of retaining arms 292. The inner portions of retaining arms 292 are retained in retaining slits 2821 defined at an outer of the cover 282. The pair of hooks 296 are formed on the outwardly deflectable locking arm 295. The hooks 296 project towards the contacting module 210. The contact module 210 is equipped with a plurality of wires 250 each including an inner conductor 252 and a shielding/braiding layer 254. The contact module 210 includes a pair of subunits 220 commonly sandwiching a metallic shielding plate 230 therebetween in the transverse direction perpendicular to both the vertical direction and the longitudinal direction.

Each subunit 220 includes a set of contacts 222 integrally formed within an insulator 224 via insert-molding. The contacts 222 includes a plurality grounding contacts 227 and a plurality of differential-pair contacts 229 alternately arranged with each other in the longitudinal direction. The differential-pair contacts 229 have the corresponding soldering sections 228 for connecting to the inner conductors 252 of the corresponding wires 250 while all the grounding contacts 227 are unified together as one piece via a transverse bar 238. The soldering sections 228' of the grounding contacts are unitarily connecting with the transverse bar 238. The transverse bar 238 is aligned and contacted with the braiding layer 252. A cutout 226 is formed in a rear side of the set of contact 222 to receive the correspond wires 250.

The insulator 224 forms a plurality of slots 237 in which the contacting/mating sections 2221 of the set of contacts 222 are exposed for mating with the contacts 134 of the receptacle connector 100. A plurality of partitions 239 form a plurality of corresponding grooves (not labeled) therebetween to receive the corresponding soldering sections 228 and the corresponding inner conductors 252 which are soldered with each other. The pair of locking fingers 223 are located at two opposite ends. The locking finger 223 is separated from the mating tongue 2241 defined by a front end of the insulator 224, while a rear end of the insulator 224 is defined as a supporting portion 2242. The locking fingers 223 extend from the supporting portion 2242. A cutout 225 is formed in a rear side to receive the corresponding wires 230. The insulator 224 forms a post 231 and a hole 233 so as to be coupled to the corresponding holes 233 and the corresponding post 231 of the other insulator 224.

A pair of grounding bars 240 are respectively attached upon the corresponding insulator 224. Each grounding bar 240 forms a pair of opposite holes 244 through which a pair of corresponding posts 231 on the corresponding insulator 224 extend, respectively. Each grounding bar 240 further forms, via stamping and forming, a plurality of rear tab 242 beside the corresponding holes 241 wherein the soldering material can be disposed in the holes 241 to solder the rear tab 242, the braiding layer 254 and the transverse bar 238 of the set of contacts 222 together. Structurally, the braiding layer 254 is sandwiched between the grounding bar 240 and the transverse bar 238 in the transverse direction.

In brief, the structures of the electrical connector assembly 10 are similar to those disclosed in the aforementioned application Ser. No. 17/212,180. For example, the differential-pair contacts 229 are originally/initially linked to the transverse bar 238 for insert-molding with the insulator 224 while successively separated from the transverse bar 238 by breaking around the soldering sections 228. The differences between the instant invention and the aforementioned applications, includes provision of the front tabs 247 on the grounding bar 240 to mechanically and electrically contact the tail section 228' of the grounding contact 227. It should be noted that in the previous applications, the tail section 228' of the grounding contacts 227 is hidden within the corresponding partitions of the insulator 224. Differently, in the instant invention such partitions aligned with the tail sections 228' or the grounding contacts 227 in the transverse direction are intentionally removed to expose the tail sections 228' of the grounding contacts 227.

In other words, the design disclosed in the previous applications uses the partitions provided by the insulator for separating the soldering tails 228 of the neighboring differential-pair contacts 227 and the associated inner conductors 252 of the corresponding (neighboring) wires 250 in the longitudinal direction. Even though the mechanical effect is superior, the electrical effect is relatively poor because of the induced crosstalk. Differently, in the instant invention, the original partitions on the tail sections of the grounding contacts are removed to expose the corresponding tail sections 228' of the grounding contacts 227, and the grounding bar 240 forms the additional front tabs 247 to not only separate the soldering tails 228 of the differential-pair contacts 229 in the longitudinal direction mechanically but also mechanically and electrically connect the tail sections 228' of the corresponding grounding contacts 227 in the transverse direction for enhancing grounding electrically. Anyhow, in the instant invention the partitions 239 of the insulator 224 for separating the corresponding soldering tails 228 of the two differential-pair contacts 229 internally in each differential pair still exist to avoid mutual contamination during soldering the inner conductors 252 upon the corresponding soldering tails 228 of the differential-pair contacts 229.

Referring to 13(A) to 14(B), the receptacle connector 100 includes a contact module 130 retained in an insulative housing 110, and a metallic shield 120 enclosing the housing 110. The contact module 130 includes a pair of subunits 131 stacked with each other in a transverse direction perpendicular to the vertical direction. Each subunit 131 includes a plurality of contacts 134 integrally formed within an insulator 132 via insert-molding. The insulator 132 further includes a post 136 and a hole 138 at two opposite ends so as to couple with the corresponding hole 138 and the post 136 of the corresponding subunit of the opposing subunit. A pair of grounding plates 140 commonly encloses the stacked subunits. Each grounding plate 140 forms a plurality of spring fingers 142 to extend into the corresponding slots (not labeled) in the corresponding insulator 132 for contacting the corresponding grounding contacts of the contacts 134. The housing 110 forms a mating cavity 114 extending along a longitudinal direction to receive the mating tongue 2241 of the contact module 210 of the plug connector 200. A plurality of passageways 115 are formed in the housing 110 to receive the corresponding contacts 134 therein, respectively.

Figure 4A:
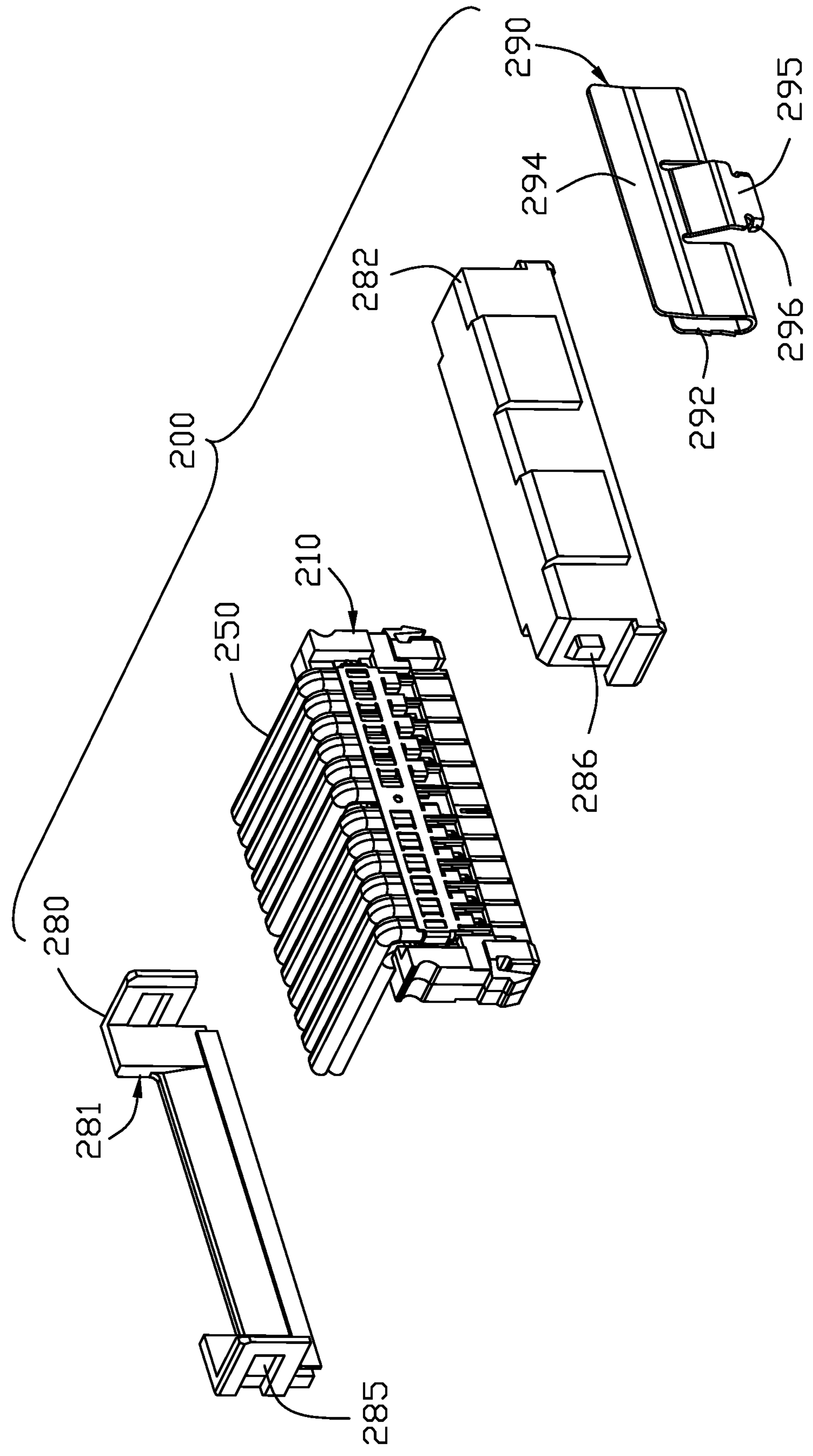
FIG. 4(A) is an exploded perspective view of the plug connector of the electrical connector assembly of FIG. 1(A)
Figure 4B:
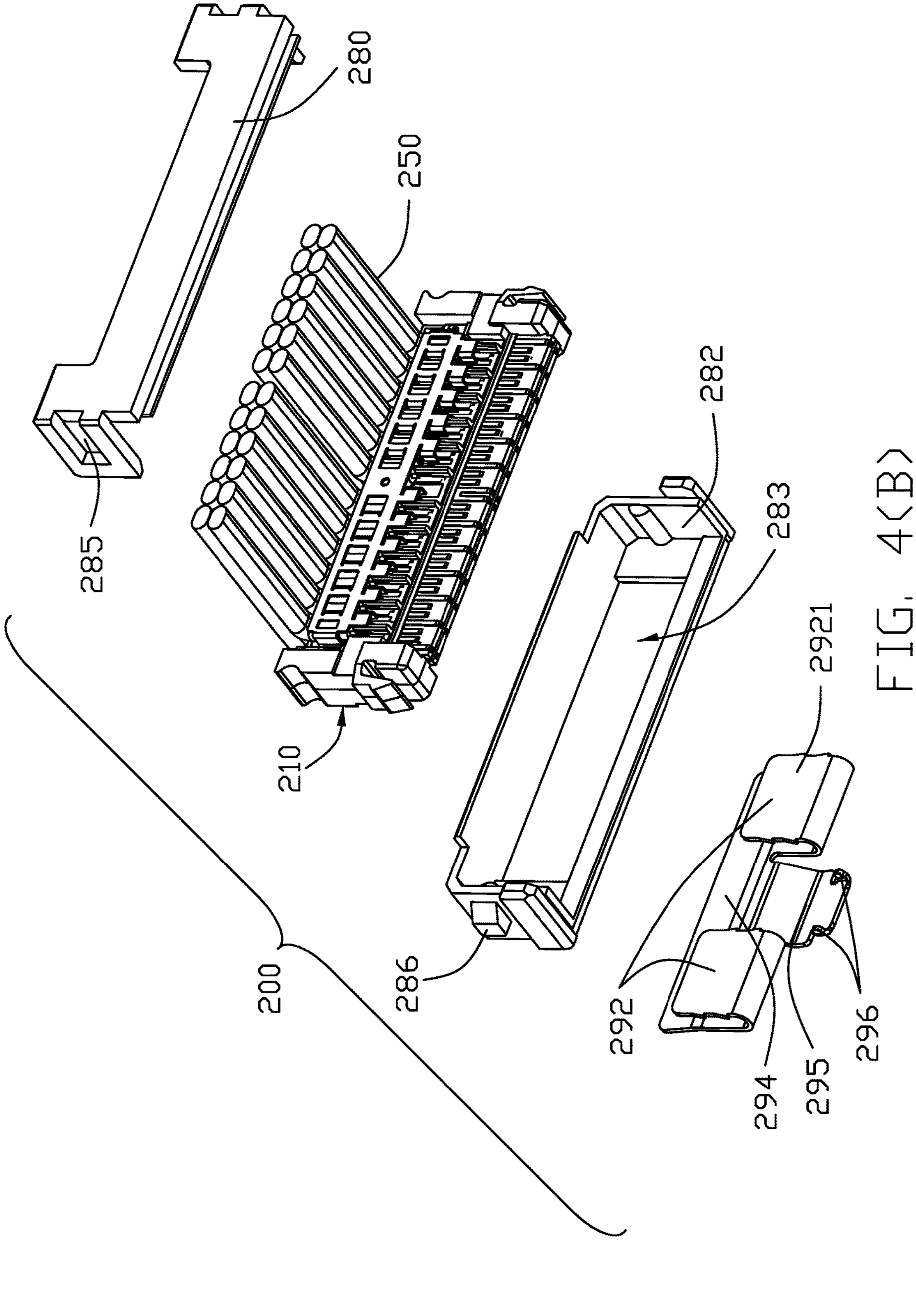
FIG. 4(B) is another exploded perspective view of the plug connector of the electrical connector assembly of FIG. 4(A)
Figure 4C:
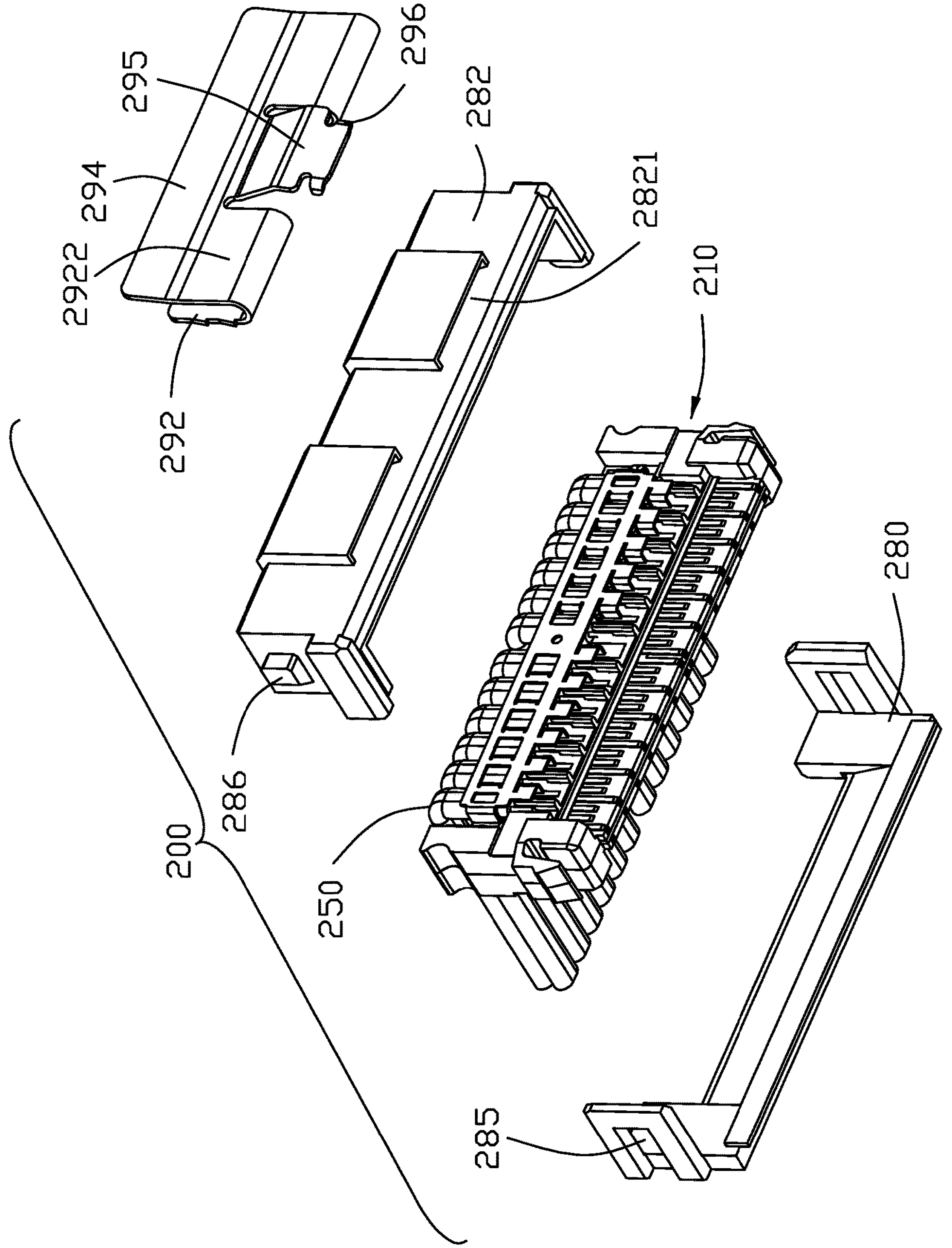
FIG. 4(C) is another exploded perspective view of the plug connector of the electrical connector assembly of FIG. 4(A)
Figure 5A:
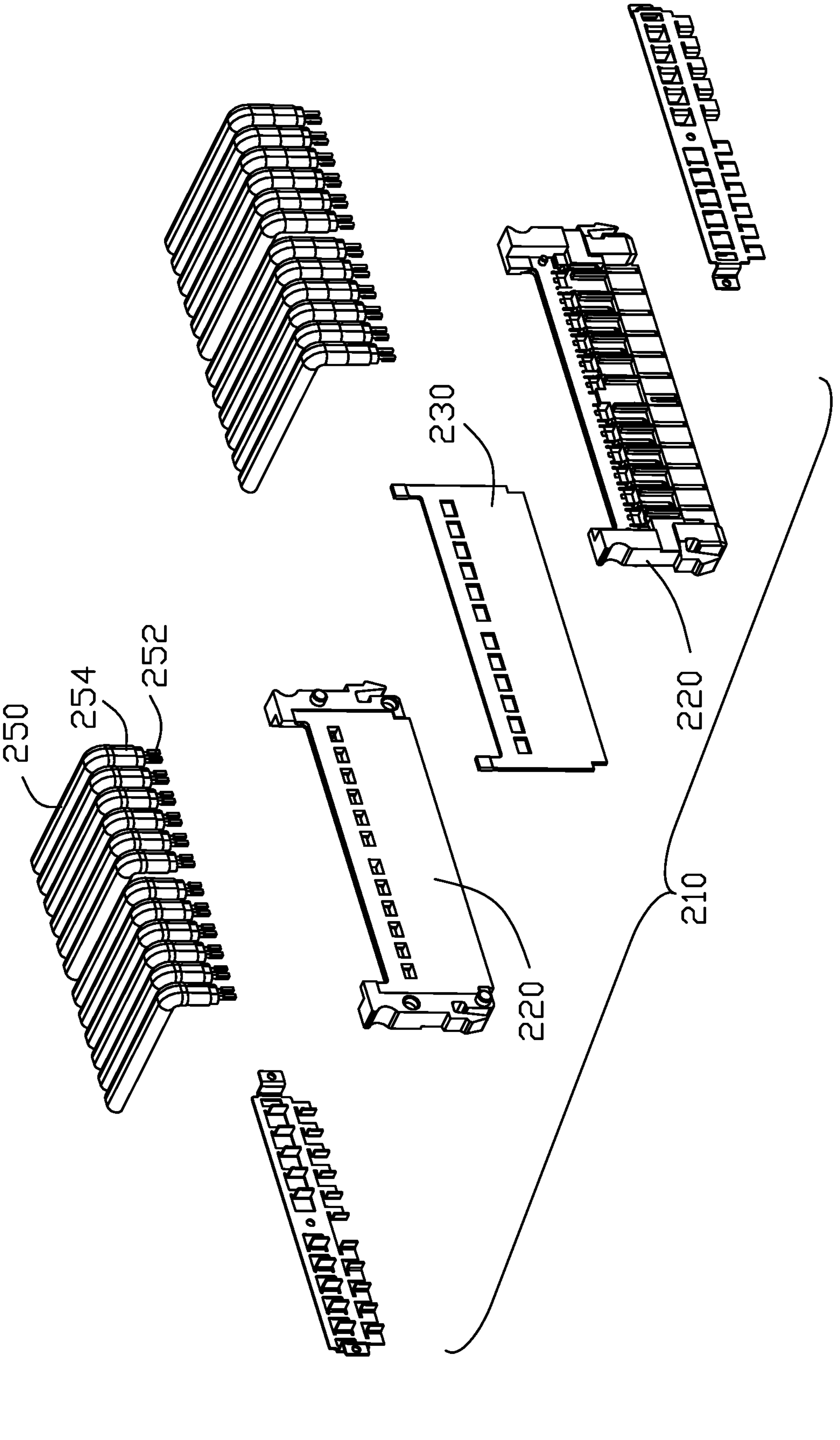
FIG. 5(A) is an exploded perspective view of contact module of the plug connector of the electrical connector assembly of FIG. 4(A)
Figure 5B:
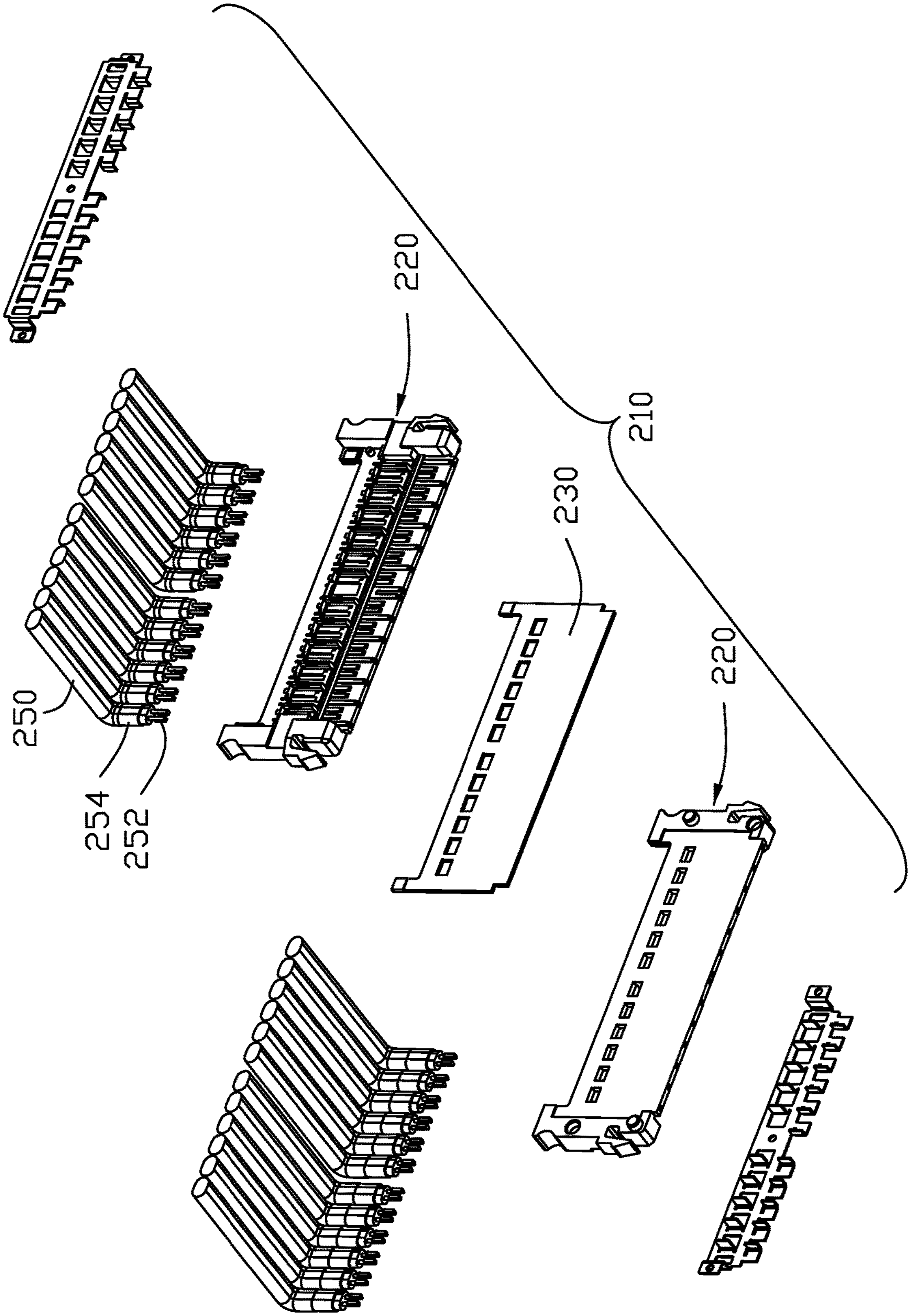
FIG. 5(B) is another exploded perspective view of the contact module of the plug connector of the electrical connector assembly of FIG. 5(A)
Figure 6A:
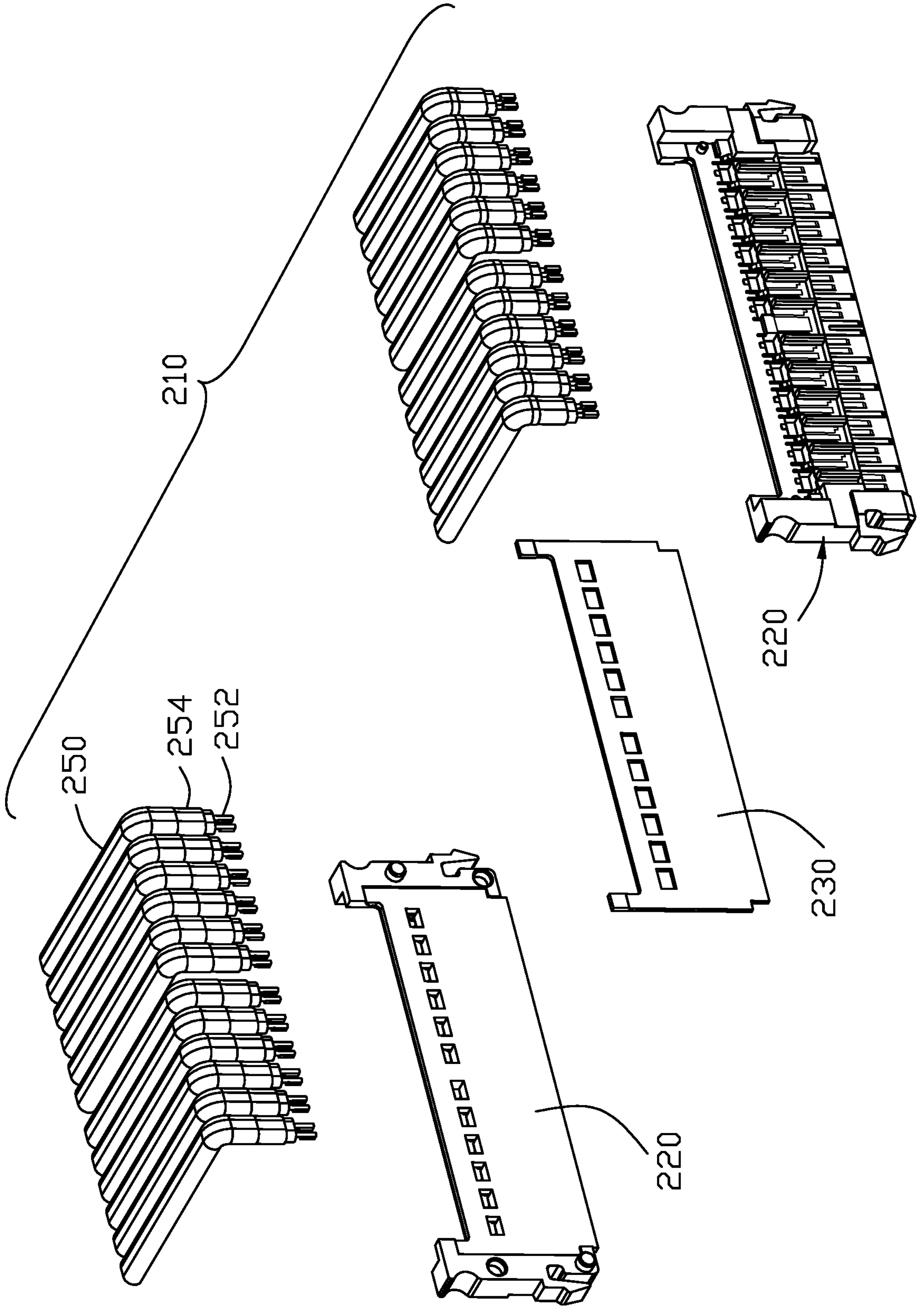
FIG. 6(A) is an exploded perspective view of the contact module of the plug connector of the electrical connector assembly of FIG. 5(A) without showing the grounding bars.
Figure 6B:
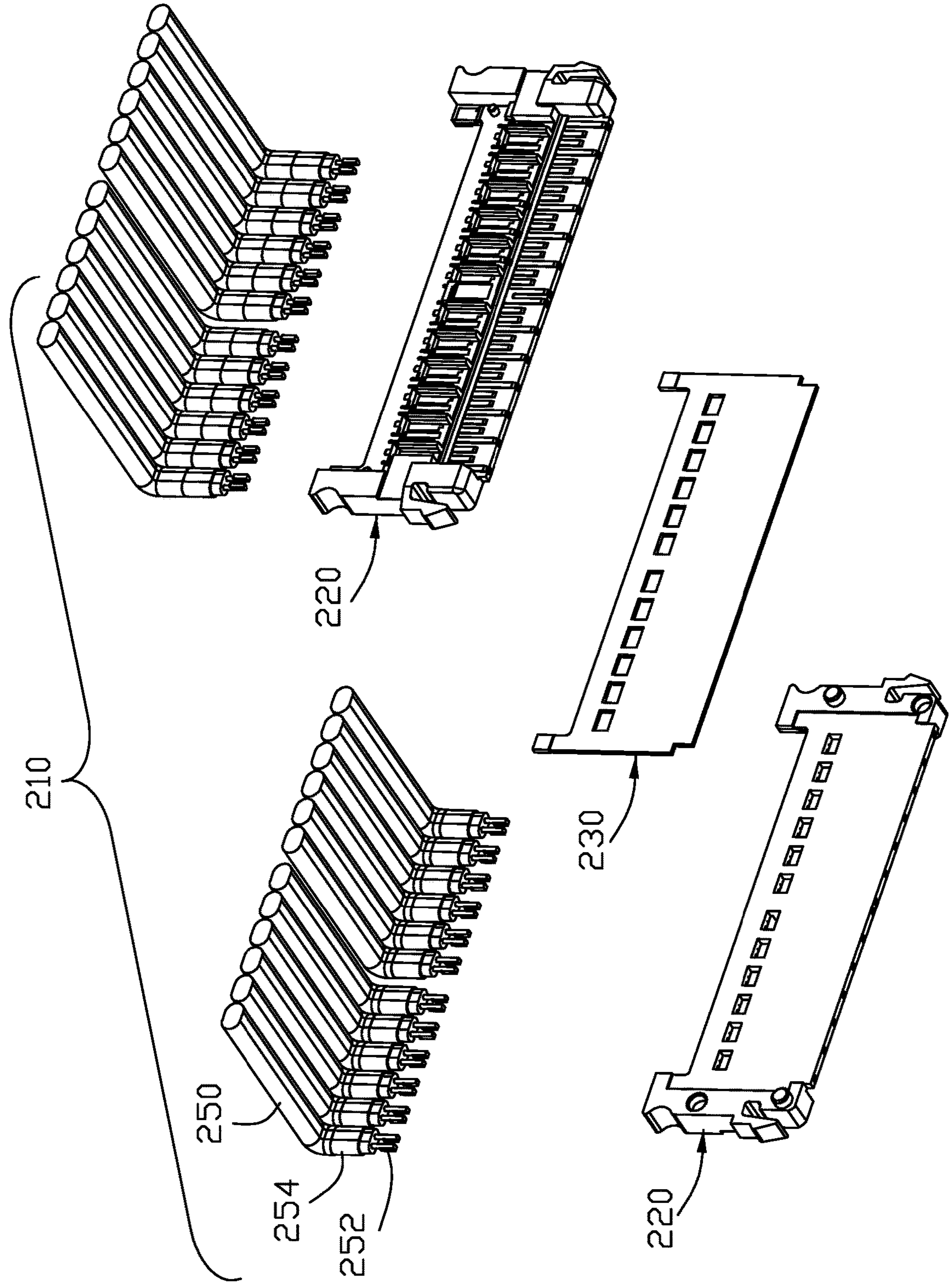
FIG. 6(B) is another exploded perspective view of the contact module of the plug connector of the electrical connector assembly of FIG. 6(A)
Figure 7A:
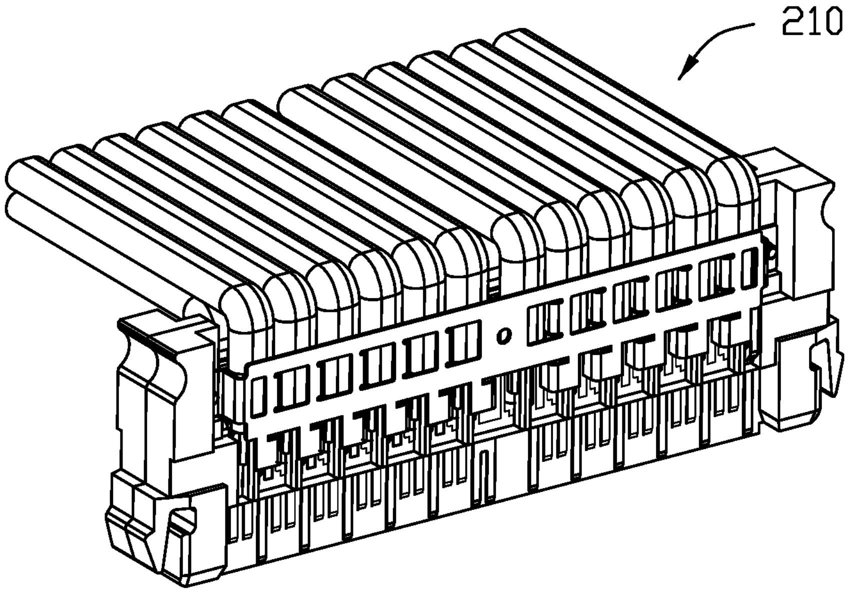
FIG. 7(A) is a perspective view of the contact module of the plug connector of the electrical connector assembly of FIG. 5(A)
Figure 7B:
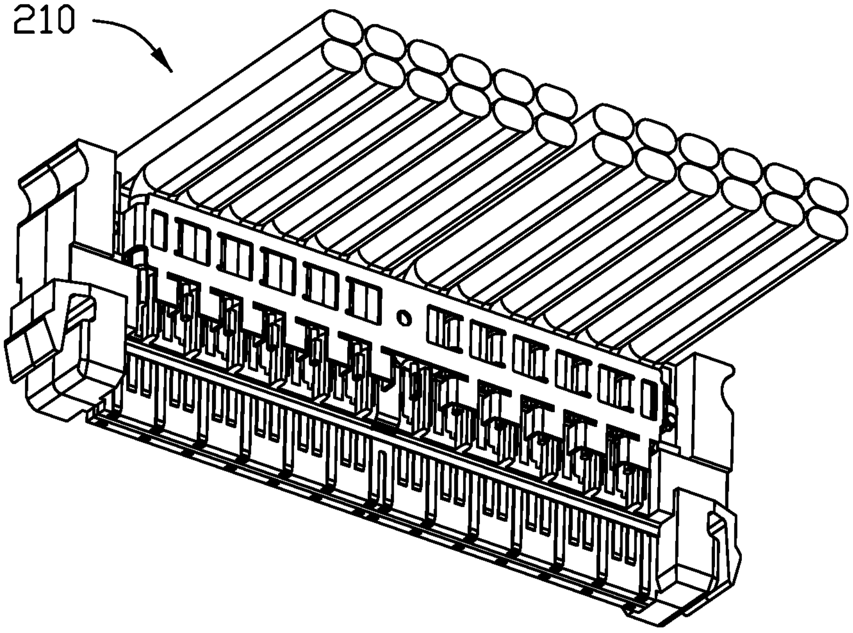
FIG. 7(B) is another explode perspective view of the contact module the plug connector of the electrical connector assembly of FIG. 7(A)
Figure 8A:
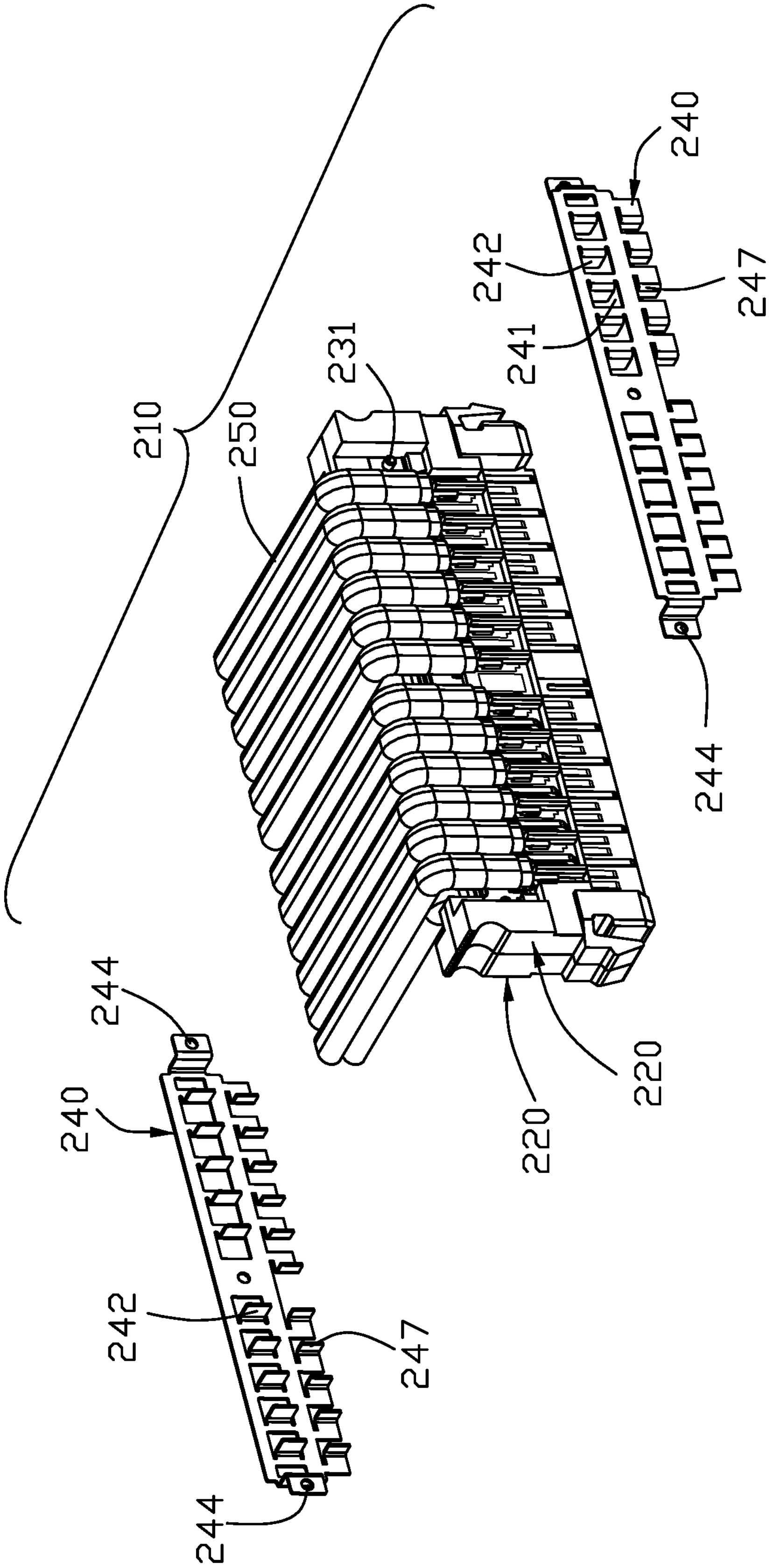
FIG. 8(A) is an exploded perspective view of the contact module of the plug connector of the electrical connector assembly of FIG. 7(A)
Figure 8B:
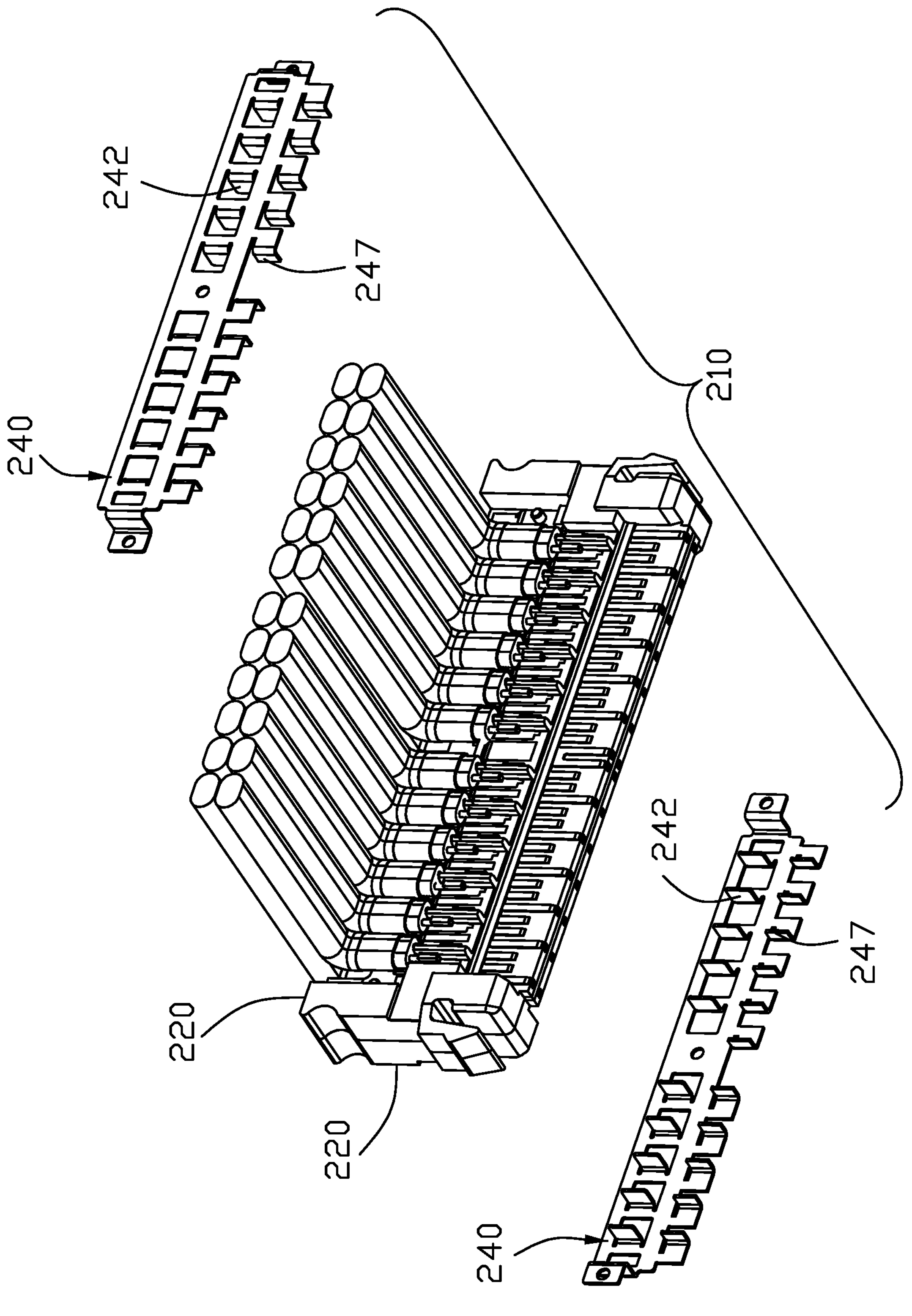
FIG. 8(B) is another exploded perspective view of the contact module of the plug connector of the electrical connector assembly of FIG. 8(A)
Figure 9:
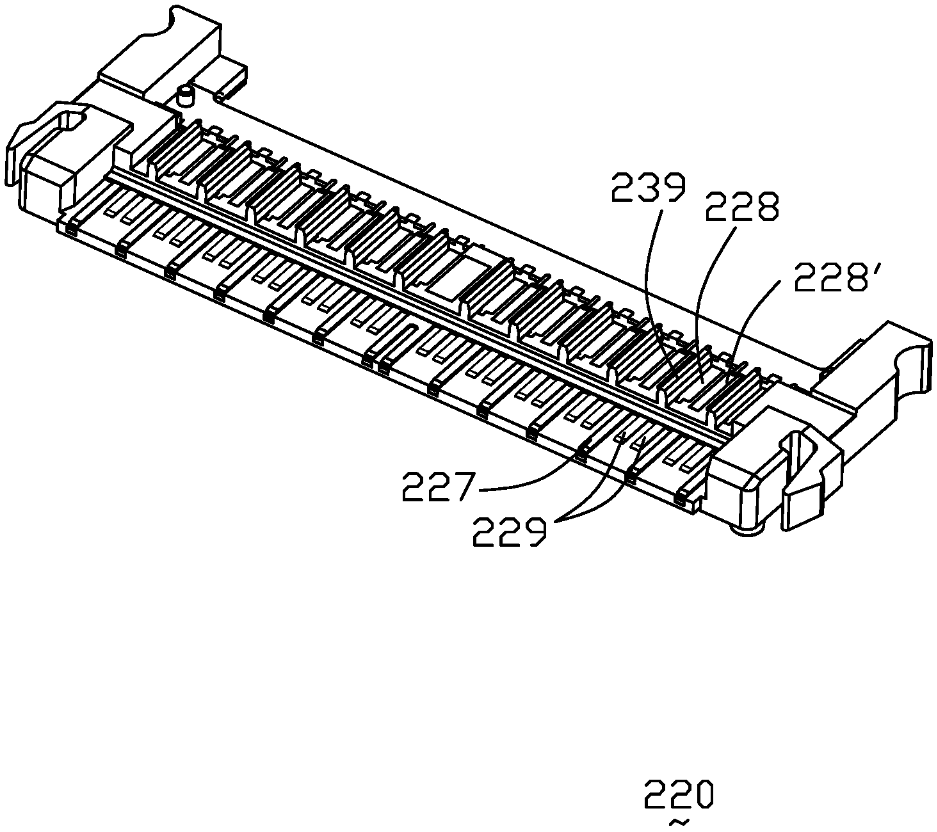
FIG. 9 is a perspective view of a half unit of the contact module of the plug connector of the electrical connector assembly of FIG. 8(A)
Figure 9A:
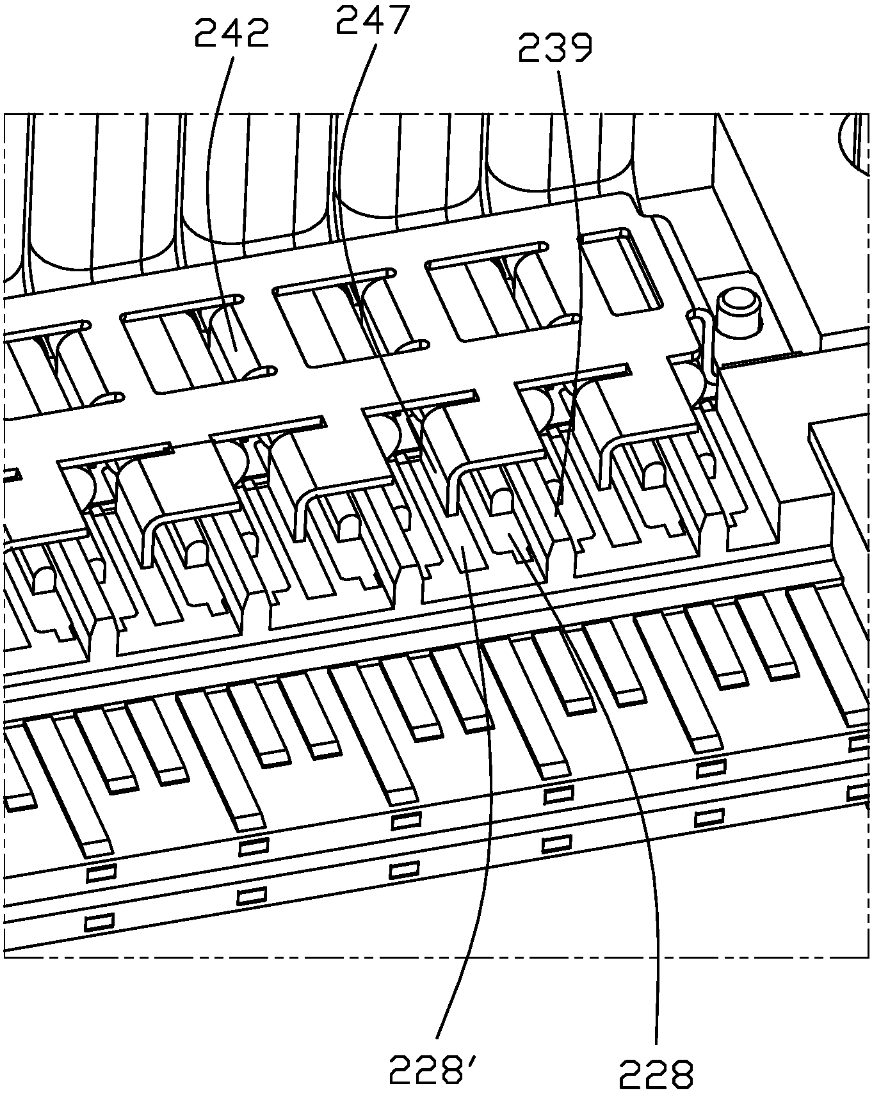
FIG. 9(A) is an enlarged perspective view of a half unit of the contact module of FIG. 9.
Figure 10:
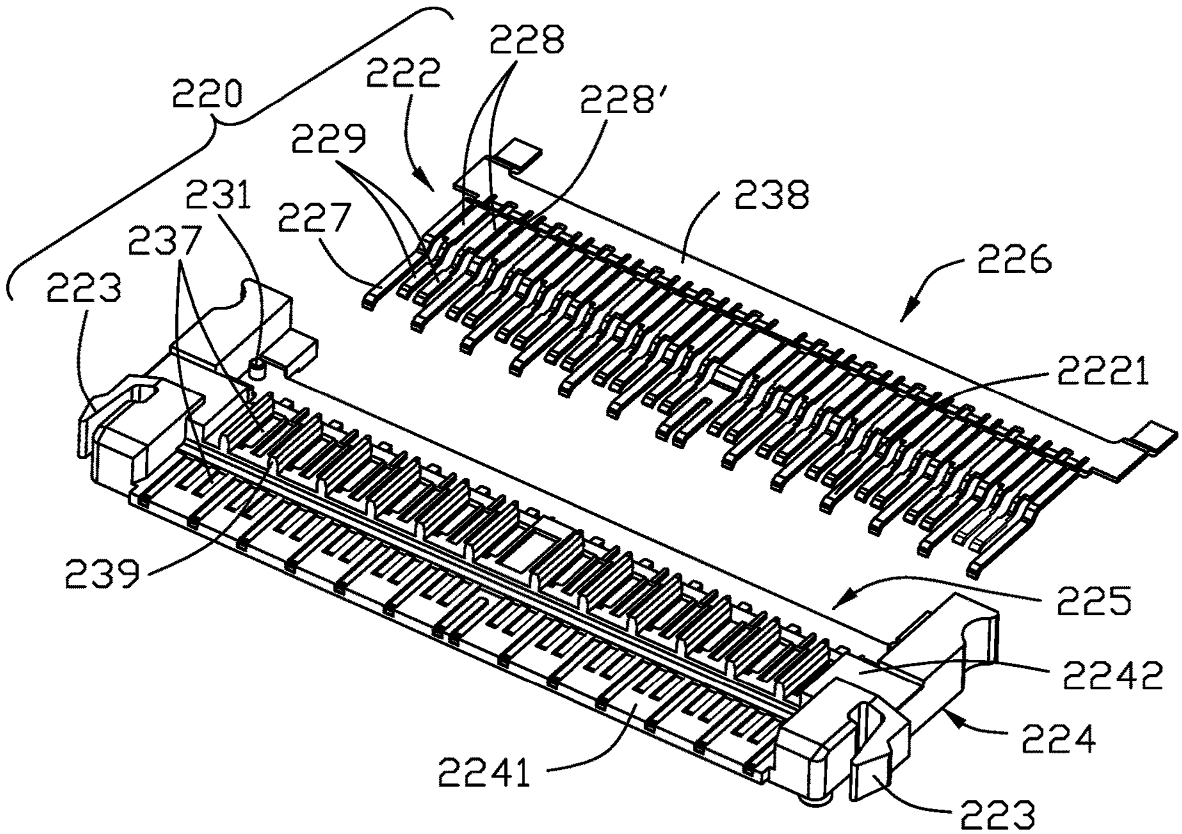
FIG. 10 is an exploded perspective view of the half unit of the contact module of the plug connector the electrical connector assembly of FIG. 9 wherein the differential-pair contacts are still linked with the transverse bar.
Figure 10A:
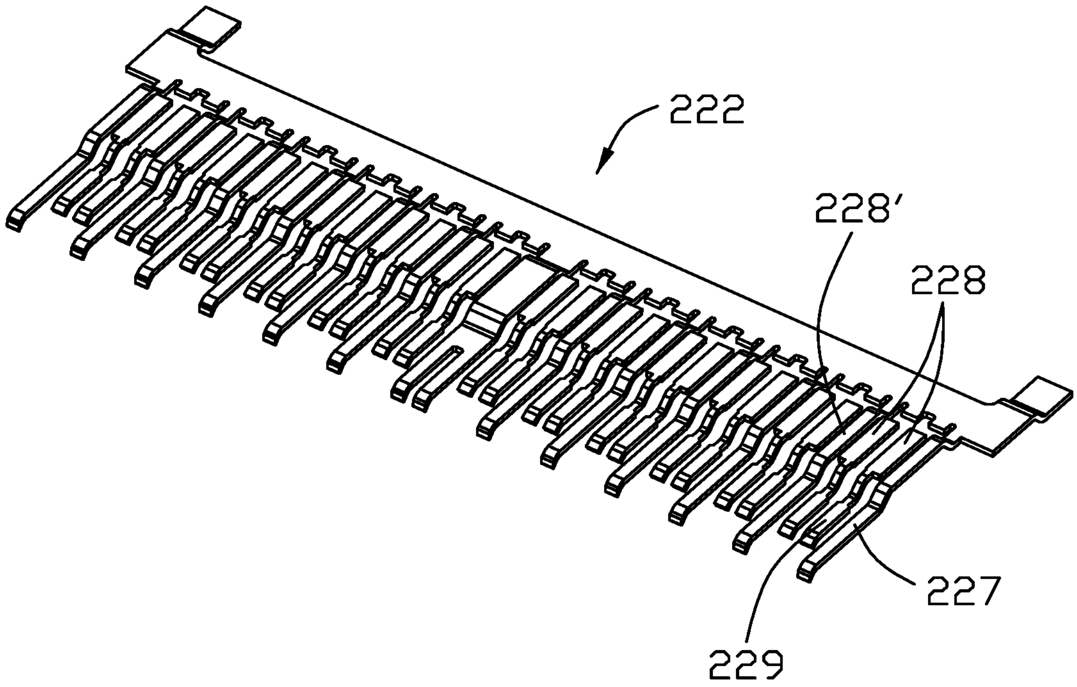
FIG. 10(A) is a perspective view of the contacts linked with the transverse bar of FIG. 10.
Figure 11:
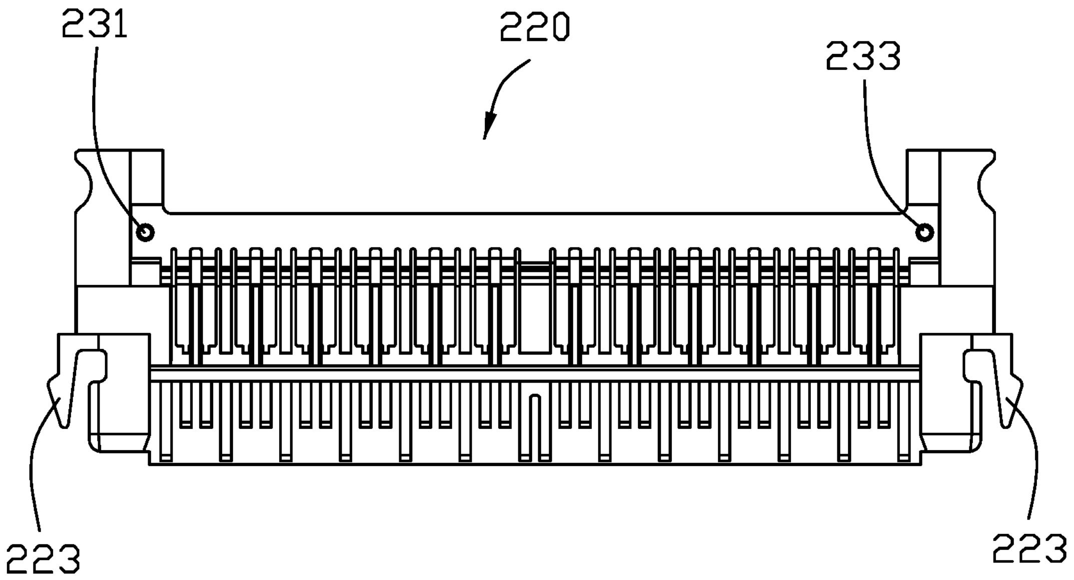
FIG. 11 is an elevational view of the half unit of the contact module of the plug connector of the electrical connector assembly of FIG. 10.
Figure 12:
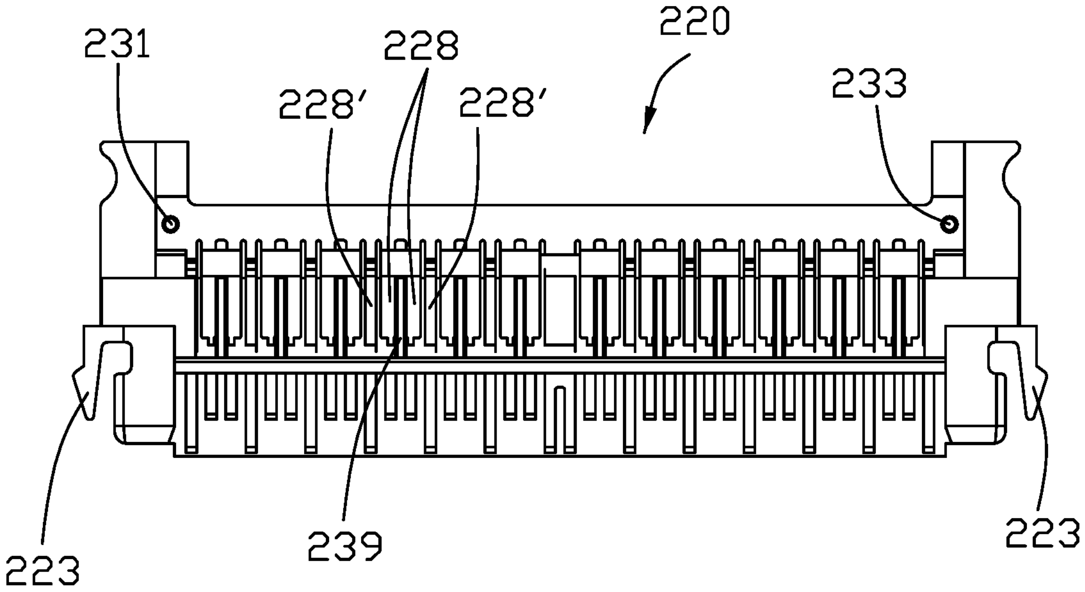
FIG. 12 is an elevational view of the half unit of the contact module of the plug connector of the electrical connector assembly of FIG. 9.
Figure 13A:
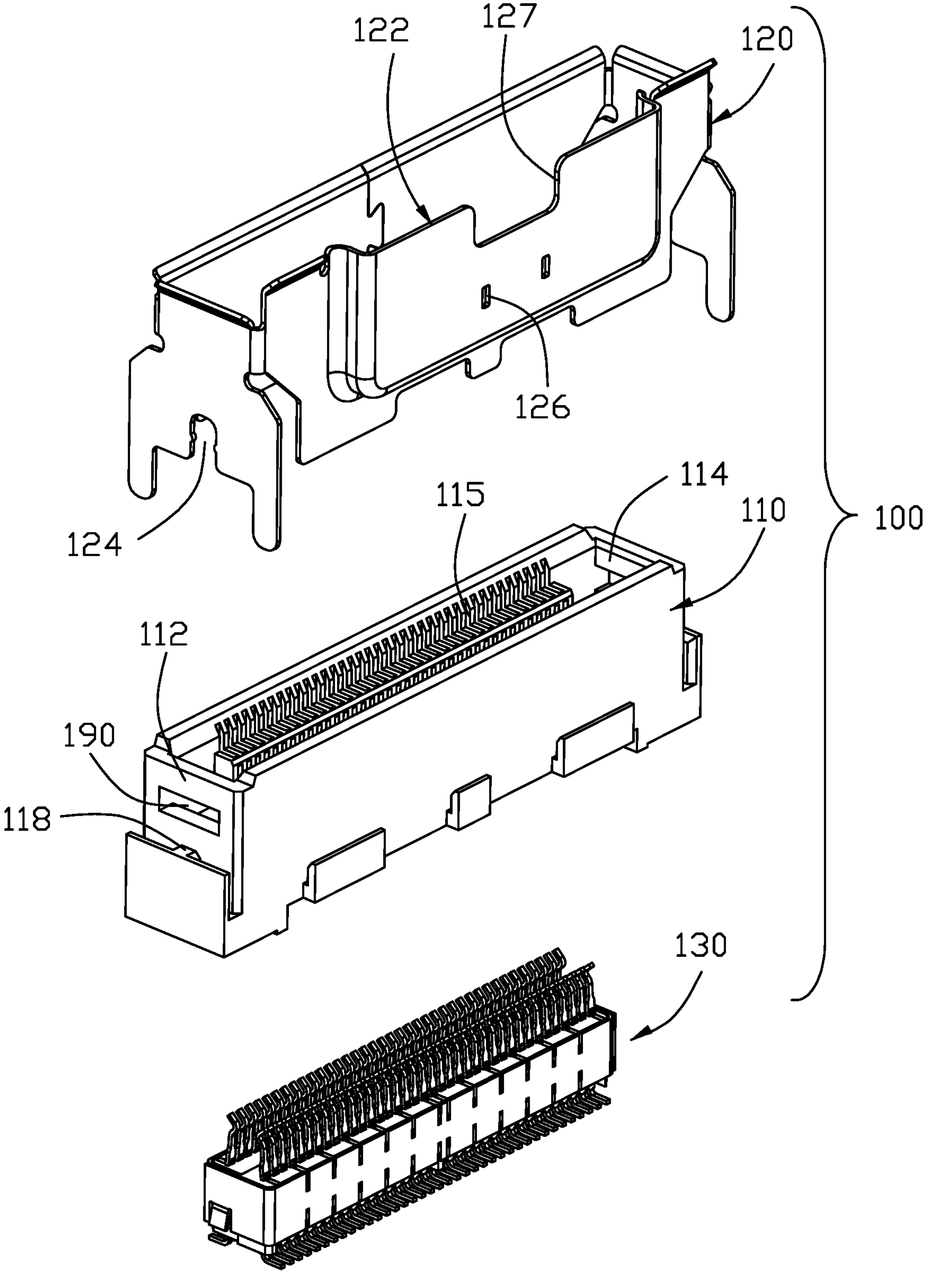
FIG. 13(A) is an exploded perspective view of the receptacle connector of the electrical connector assembly of FIG. 2(A)
Figure 13B:
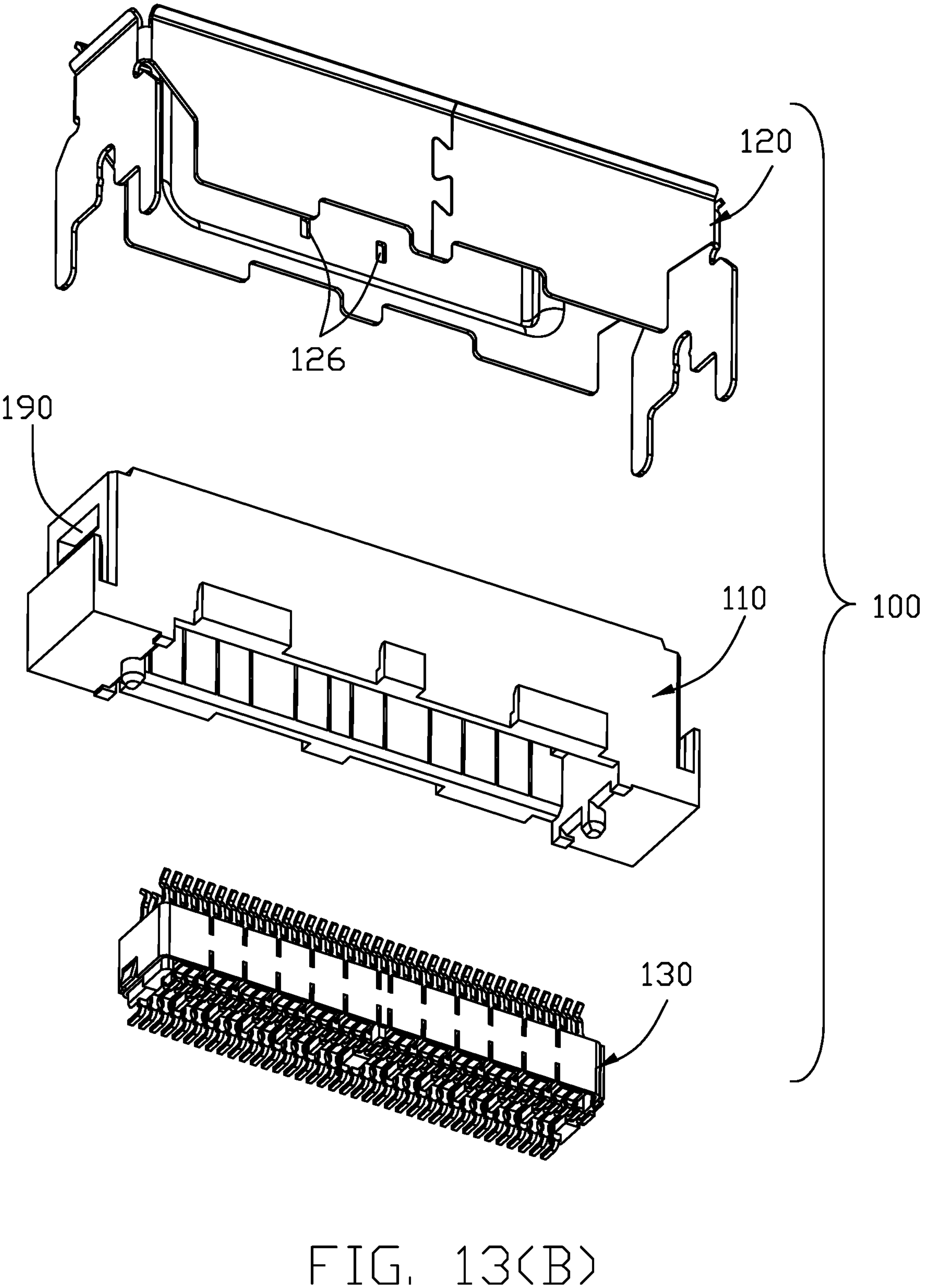
FIG. 13(B) is another exploded perspective view of the receptacle connector of the electrical connector assembly of FIG. 13(A)
Figure 14A:
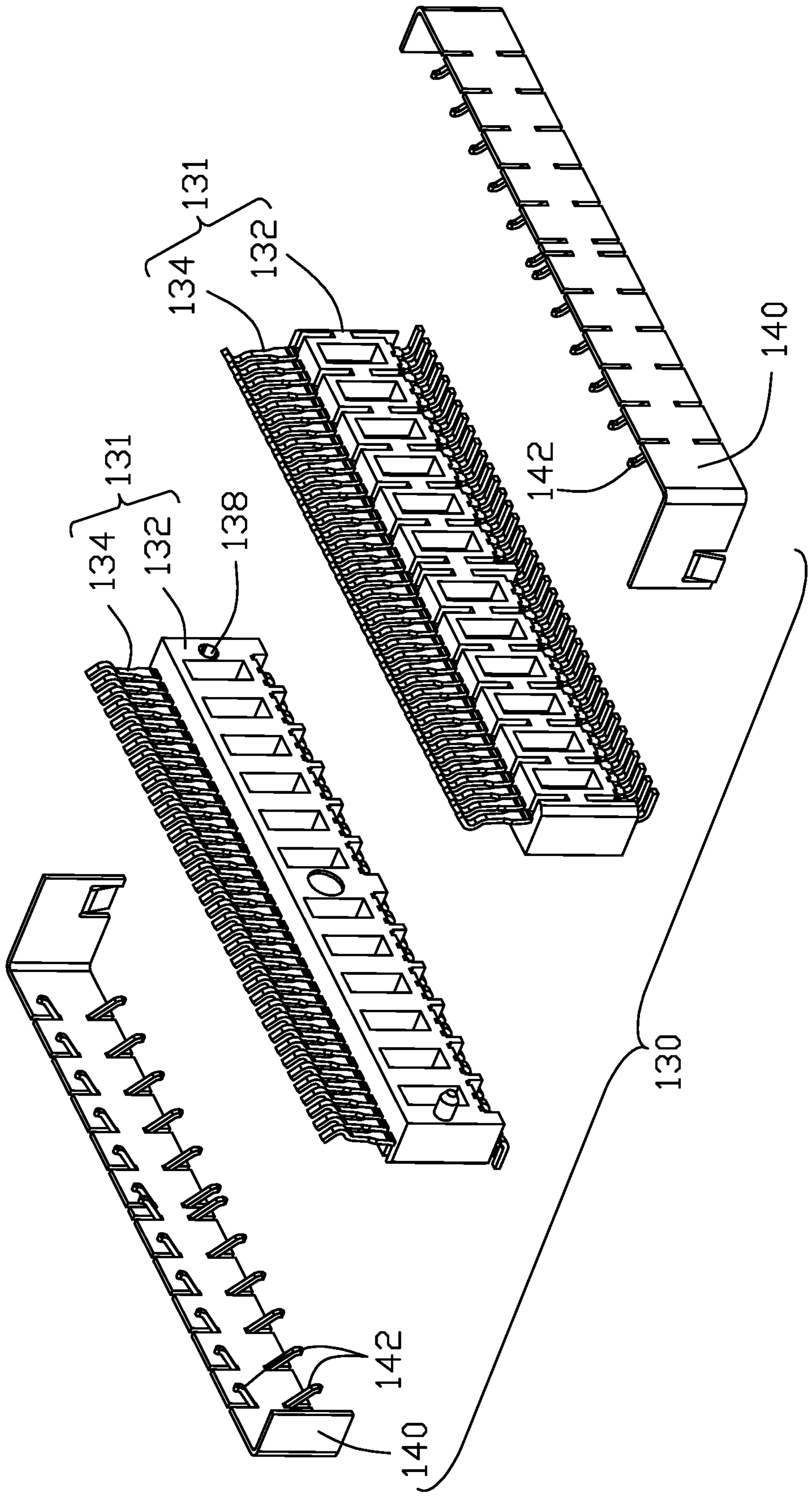
FIG. 14(A) is an exploded perspective view of the contact module of the receptacle connector of the electrical connector assembly of FIG. 13(A)
Figure 14B:
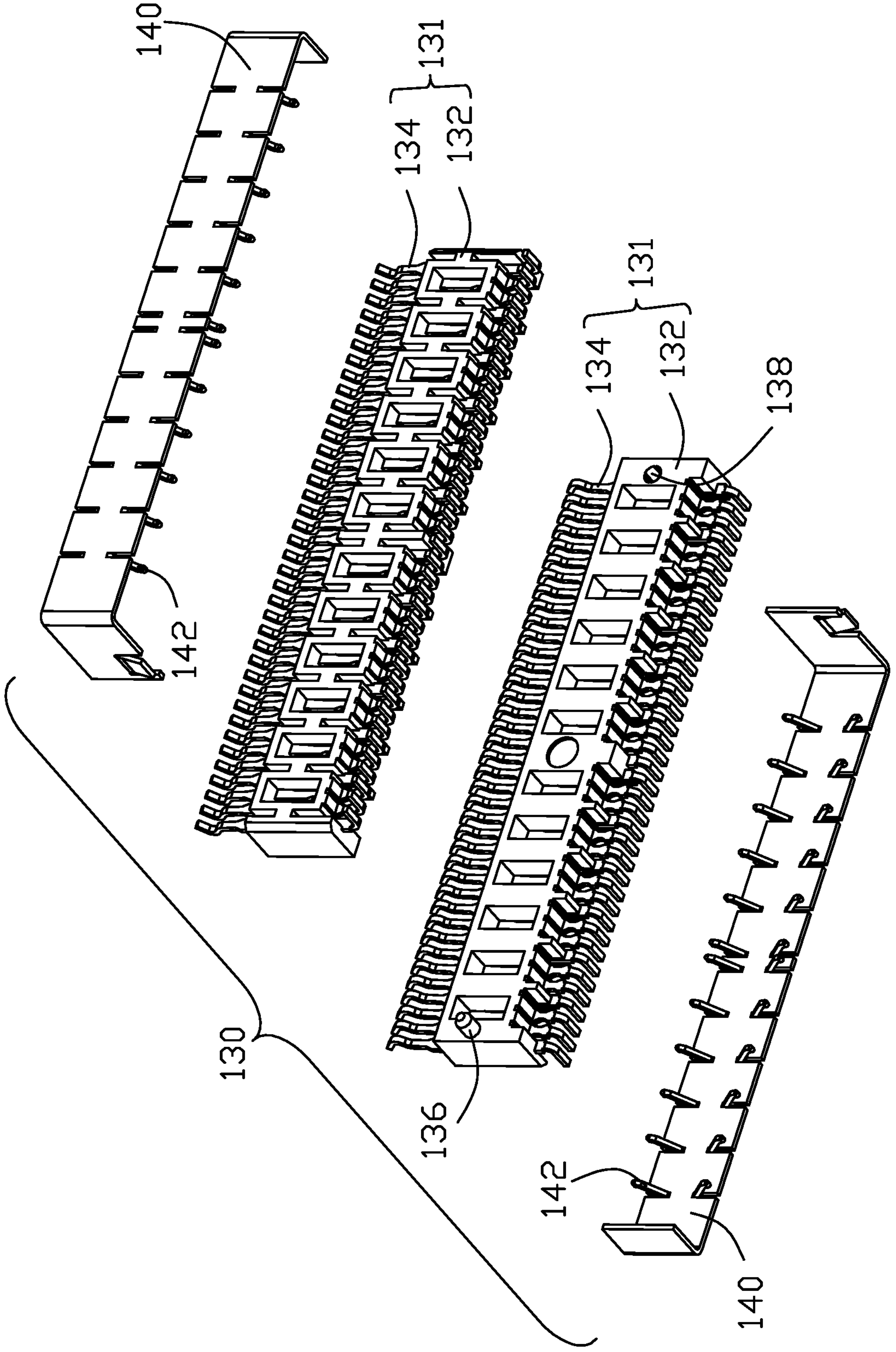
FIG. 14(B) is another exploded perspective view of the contact module of the receptacle connector of the electrical connector assembly of FIG. 4(A)

A pair of locking opening 119 are formed at two opposite end walls 112 to receive the corresponding locking fingers 223 of the subunits 220 of the contact module 210 of the plug connector 200. An engagement rib 118 is formed at either end walls 112 of the housing 110. A pair of engagement notches 124 are formed in opposite end walls for engagement with the engagement ribs 118. The shield 120 forms a locking space 122 to receive the outward deflectable latch 290 of the plug connector 200. A pair of holes 126 are formed beside the locking space 122 for receive the corresponding hooks 296 of the latch 290. The shield 120 forms a cutout 127 to receive the corresponding deflectable locking arm 295 of the latch 290, and the pair of holes 126 are located under the cutout 127 in the vertical direction. The retaining arm 292 includes an inner plate 2921 and outer plate 2922 as shown in FIG. 4(B) and FIG. 4(C), the inner plate 2921 is retained in the retaining slit 2821, the outer plate 2921 is received in the locking space 122. The locking arm 295 cross the cutout 127 and reach an outer side of the shield 120. The hooks 296 enter inward into the holes 126.

Figure 15A:
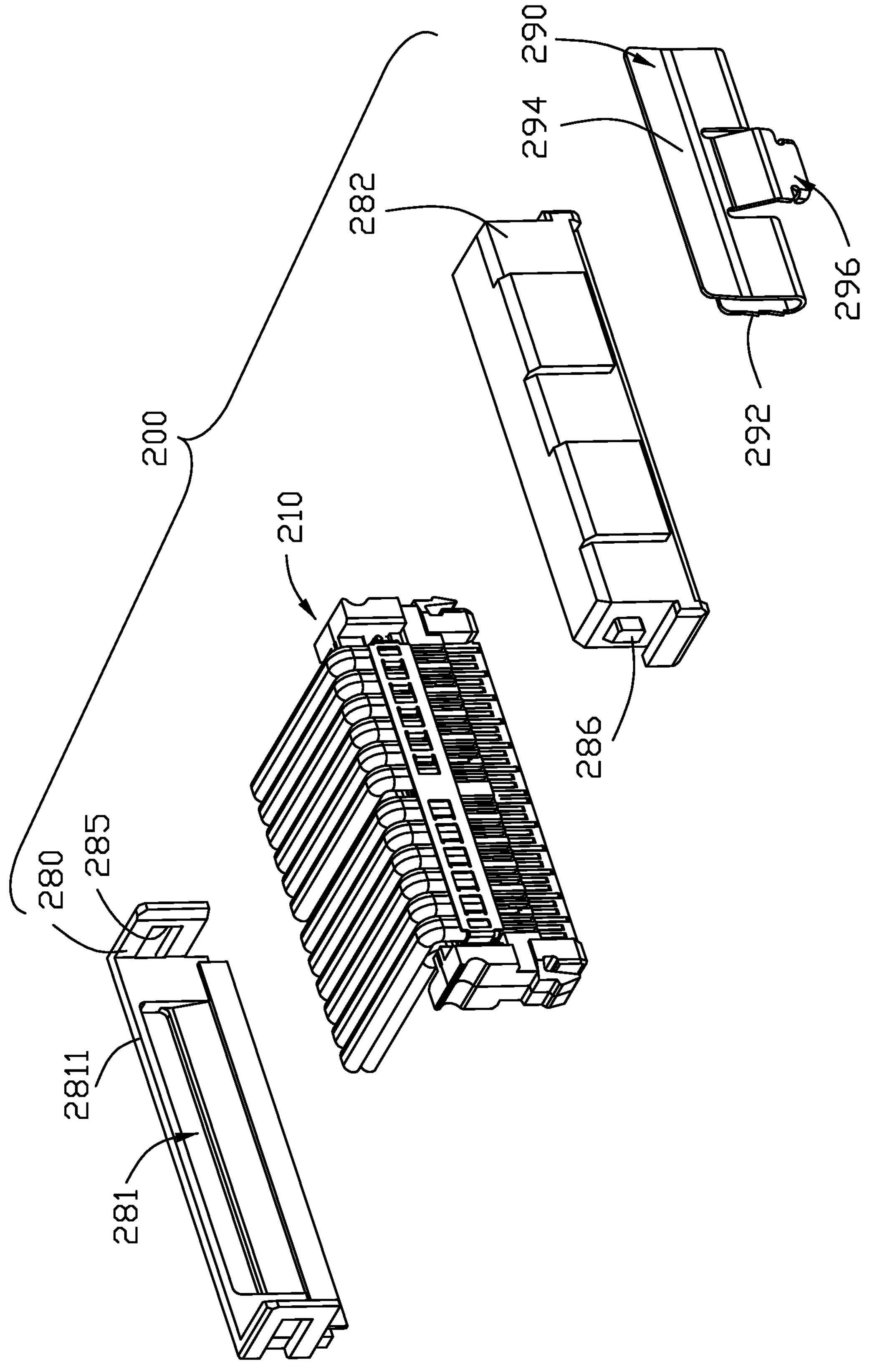
FIG. 15(A) is a perspective view of the plug connector according to the second embodiment of the invention.
Figure 15B:
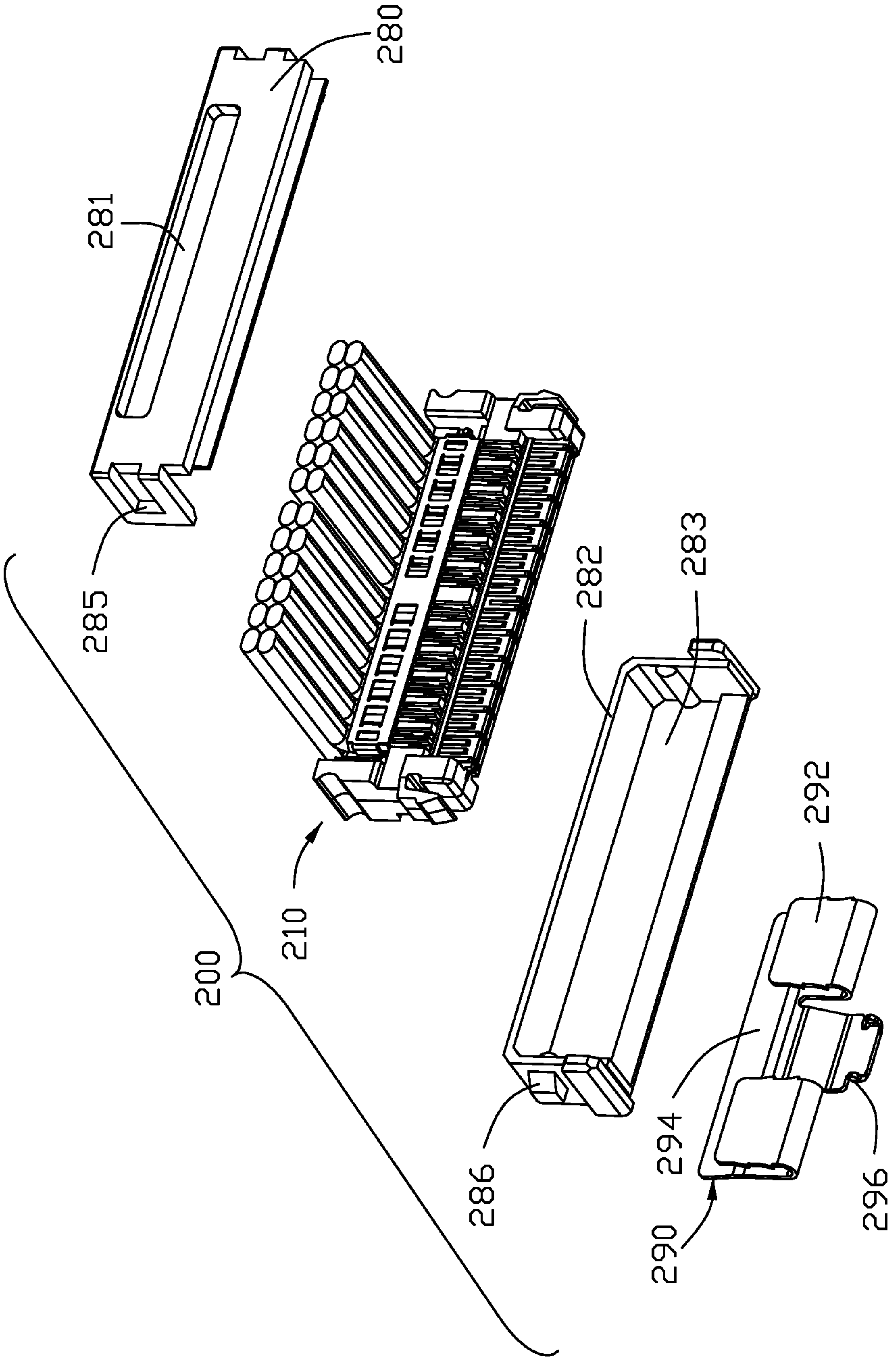
FIG. 15(B) is another perspective view of the plug connector of FIG. 15(A)
Figure 16A:
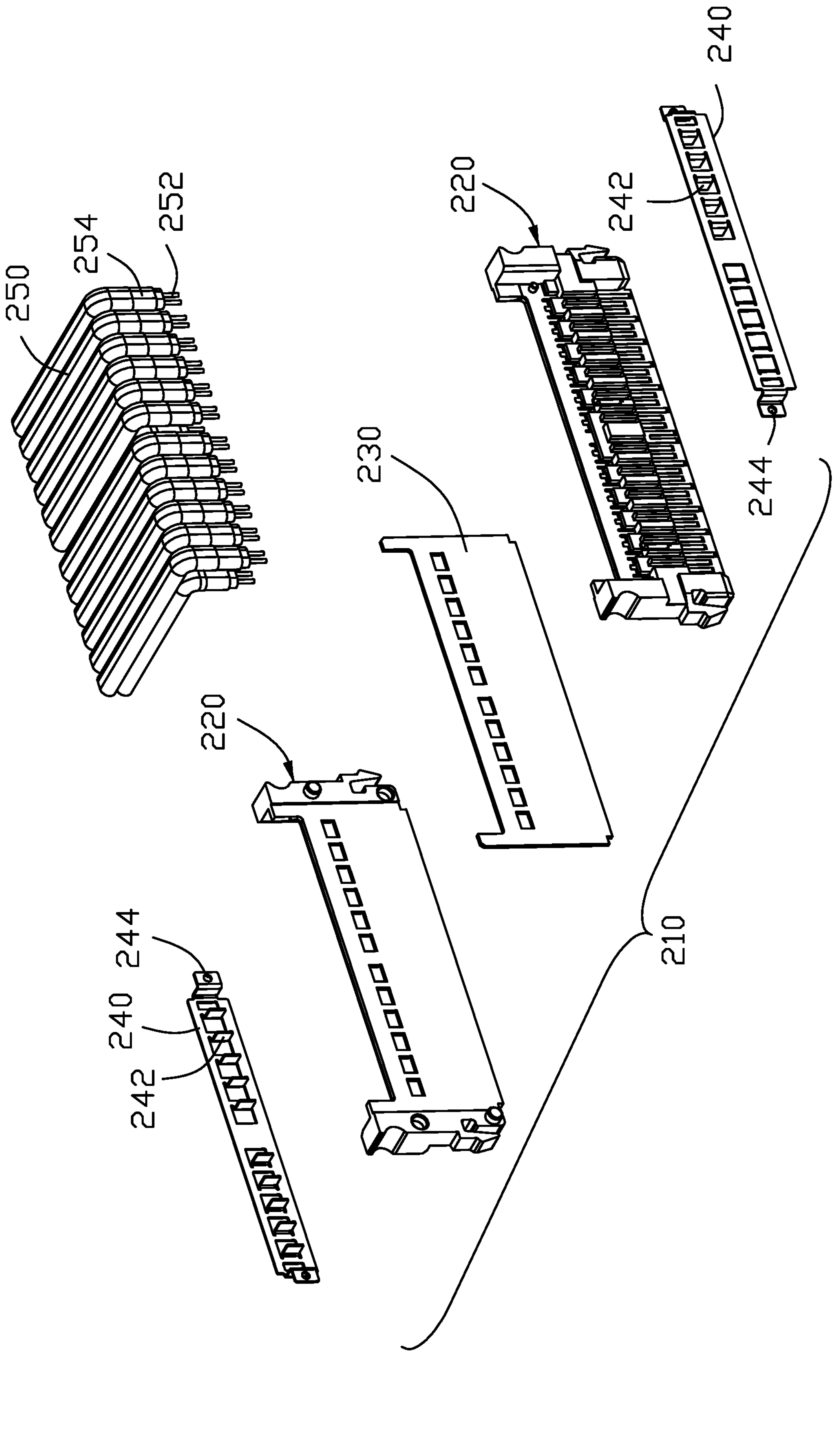
FIG. 16(A) is a further exploded perspective view of the plug connector of FIG. 15(A)
Figure 16B:
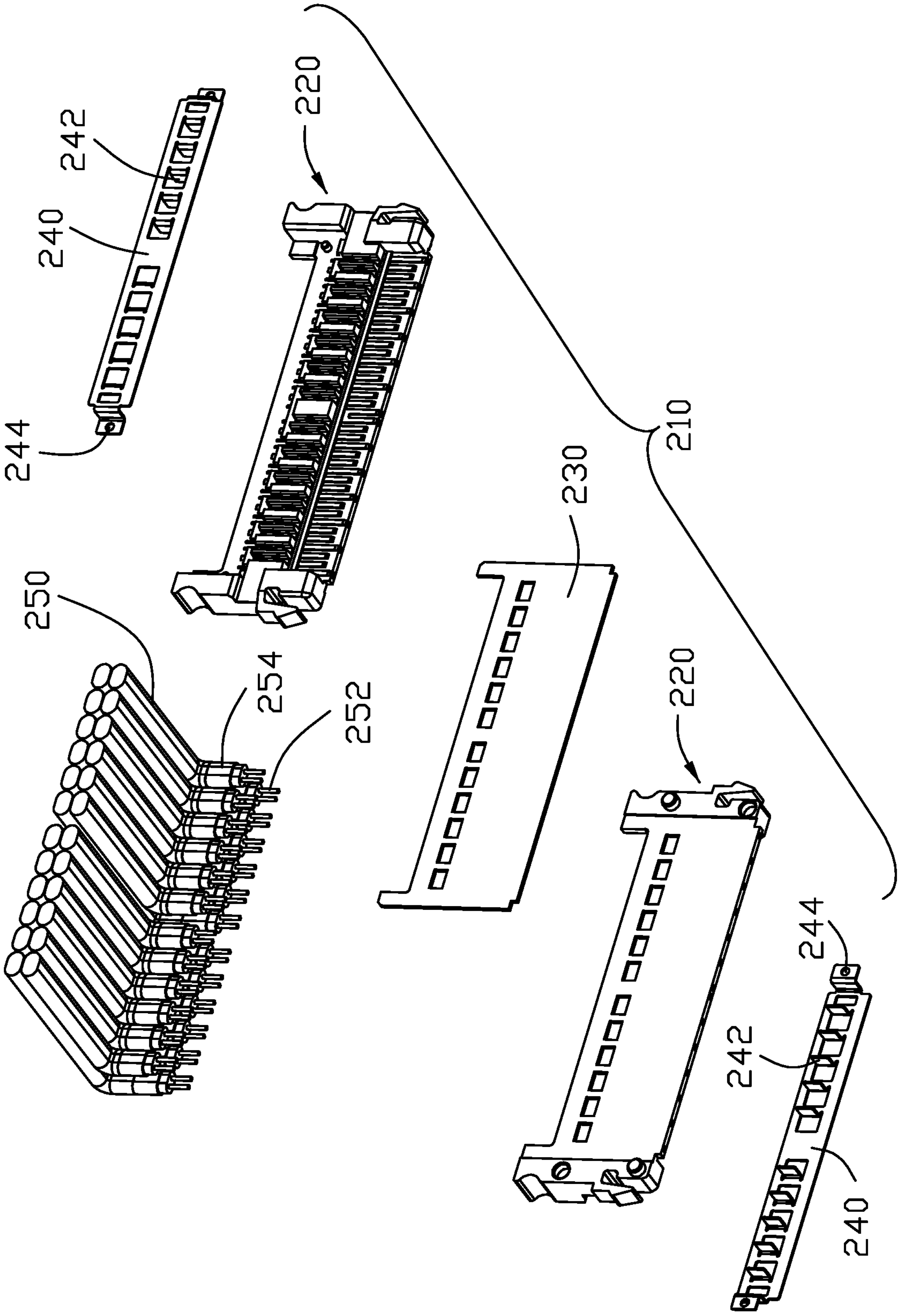
FIG. 16(B) is another perspective view of the plug connector of FIG. 16(A)
Figure 17A:
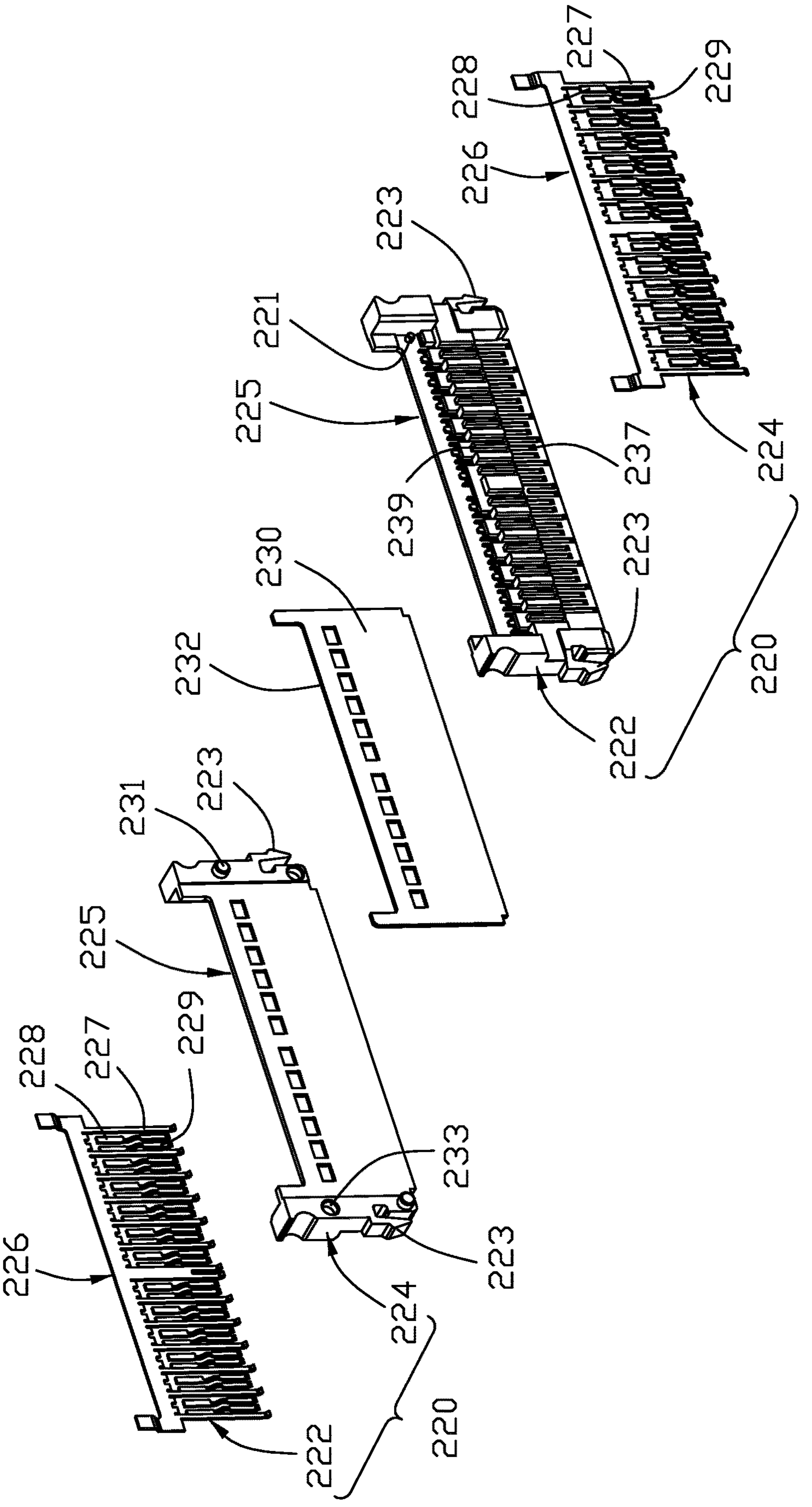
FIG. 17(A) is a further exploded perspective view of the plug connector of FIG. 16(A)
Figure 17B:
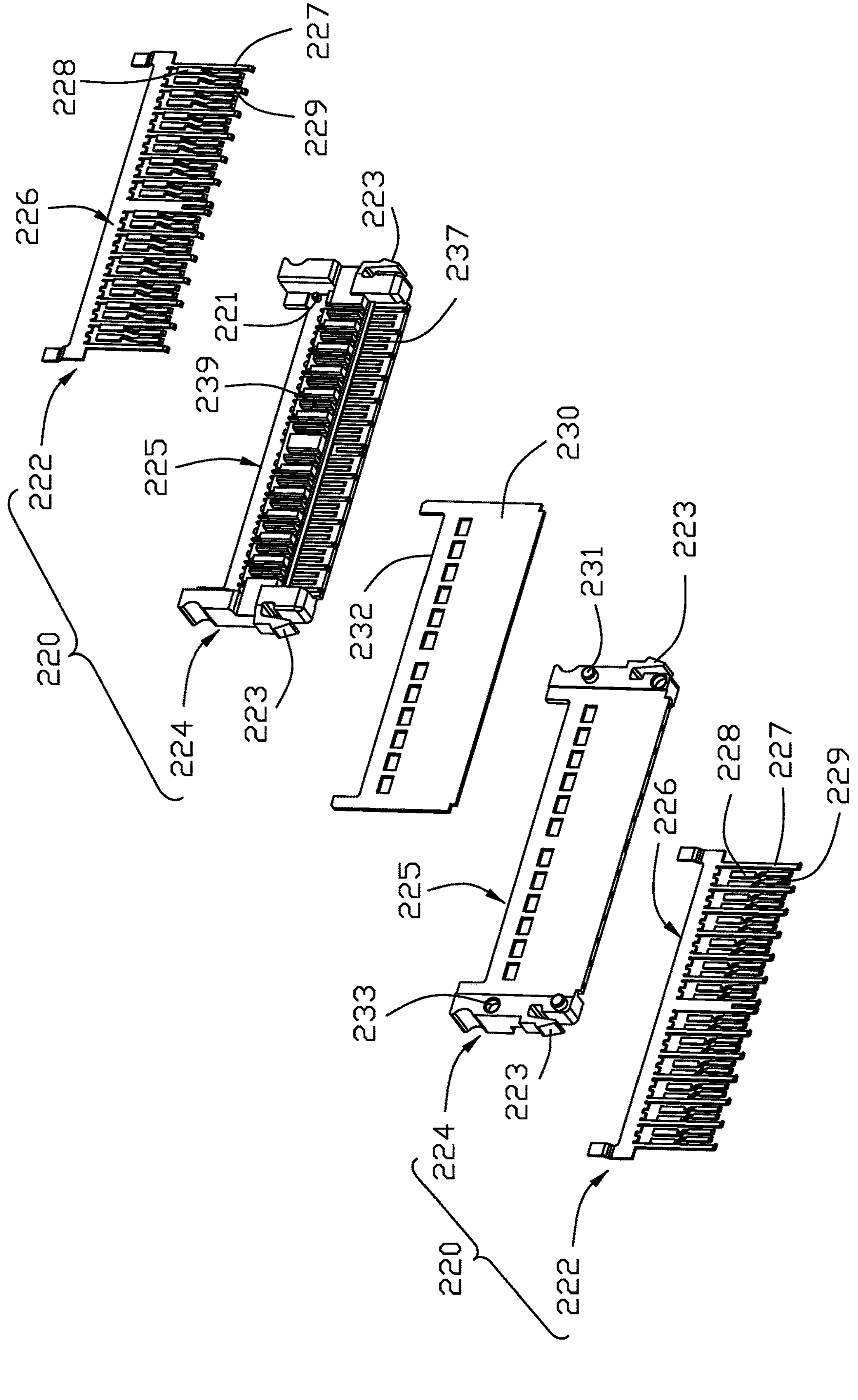
FIG. 17(B) is another perspective view of the plug connector of FIG. 17(A)
Figure 18A:
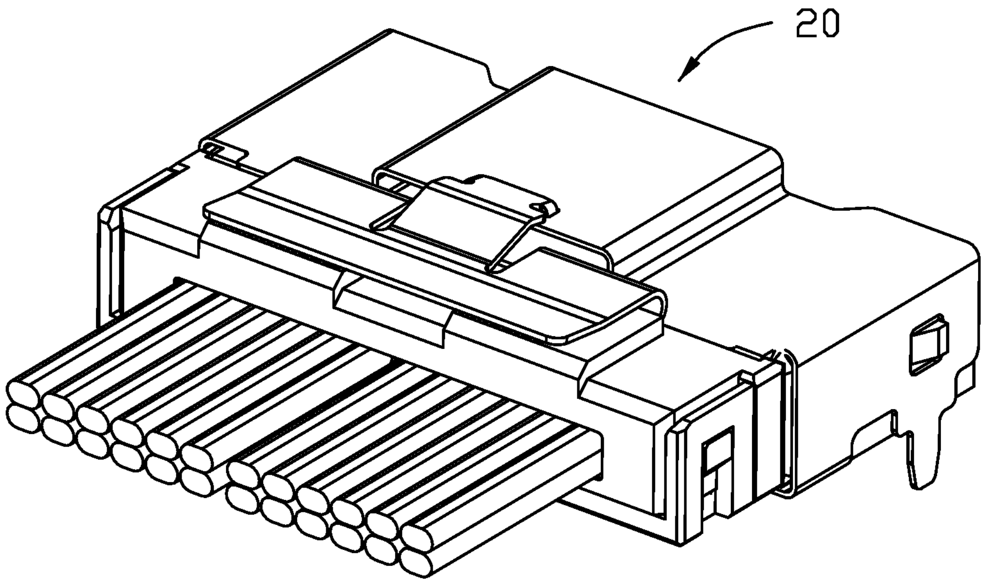
FIG. 18(A) is a perspective view of the electrical connector assembly including the mated plug connector and receptacle connector according to a third embodiment of the invention.
Figure 18B:
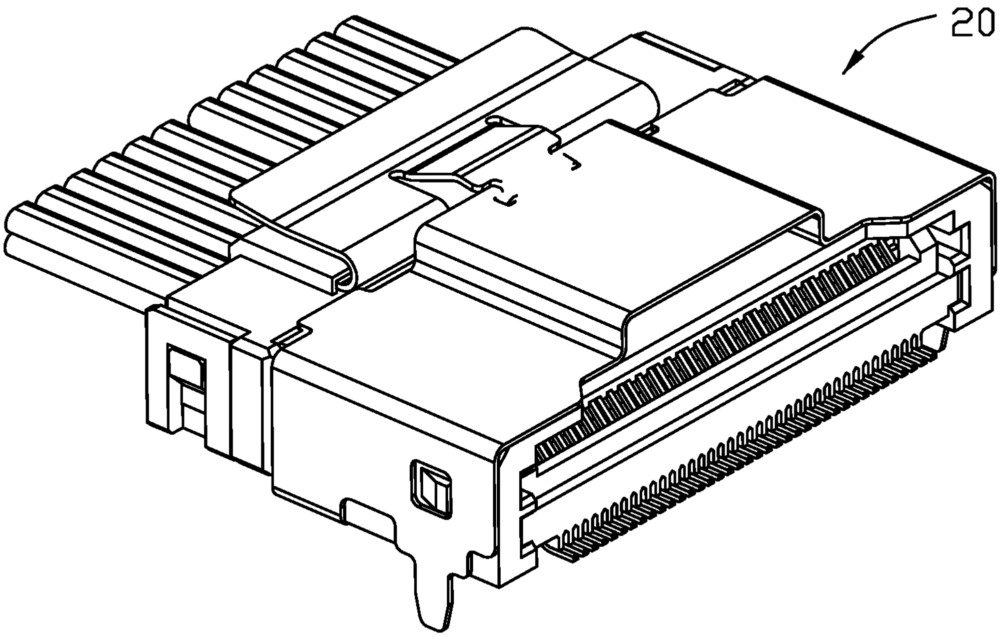
FIG. 18(B) is another perspective view of the electrical connector assembly of FIG. 18(A)
Figure 18C:
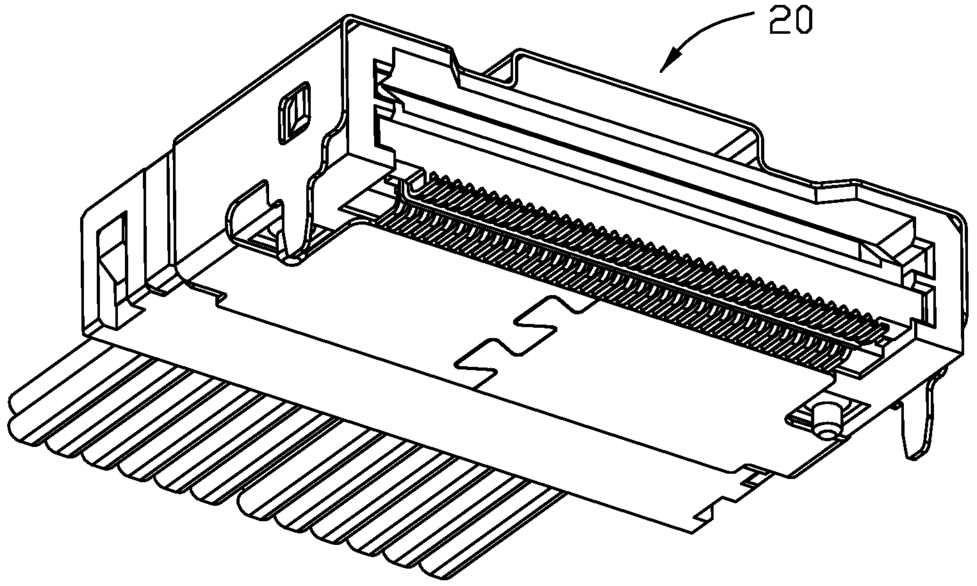
FIG. 18(C) is a perspective view of the electrical connector assembly of FIG. 18(A) without showing the printed circuit board thereof.
Figure 19A:
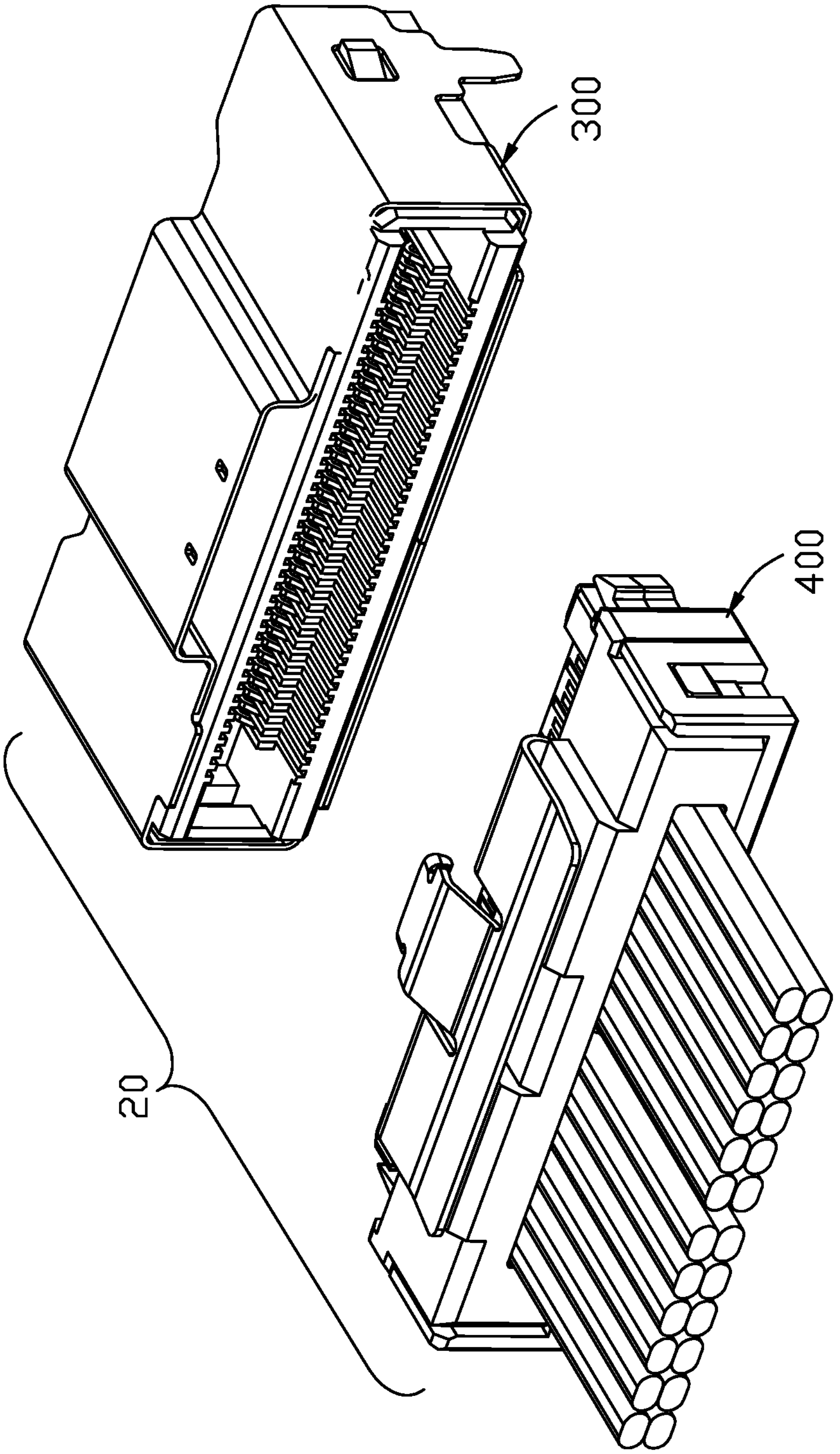
FIG. 19(A) is a perspective view of the electrical connector assembly of FIG. 17(A) wherein the plug connector and the receptacle connector are separated from each other.
Figure 19B:
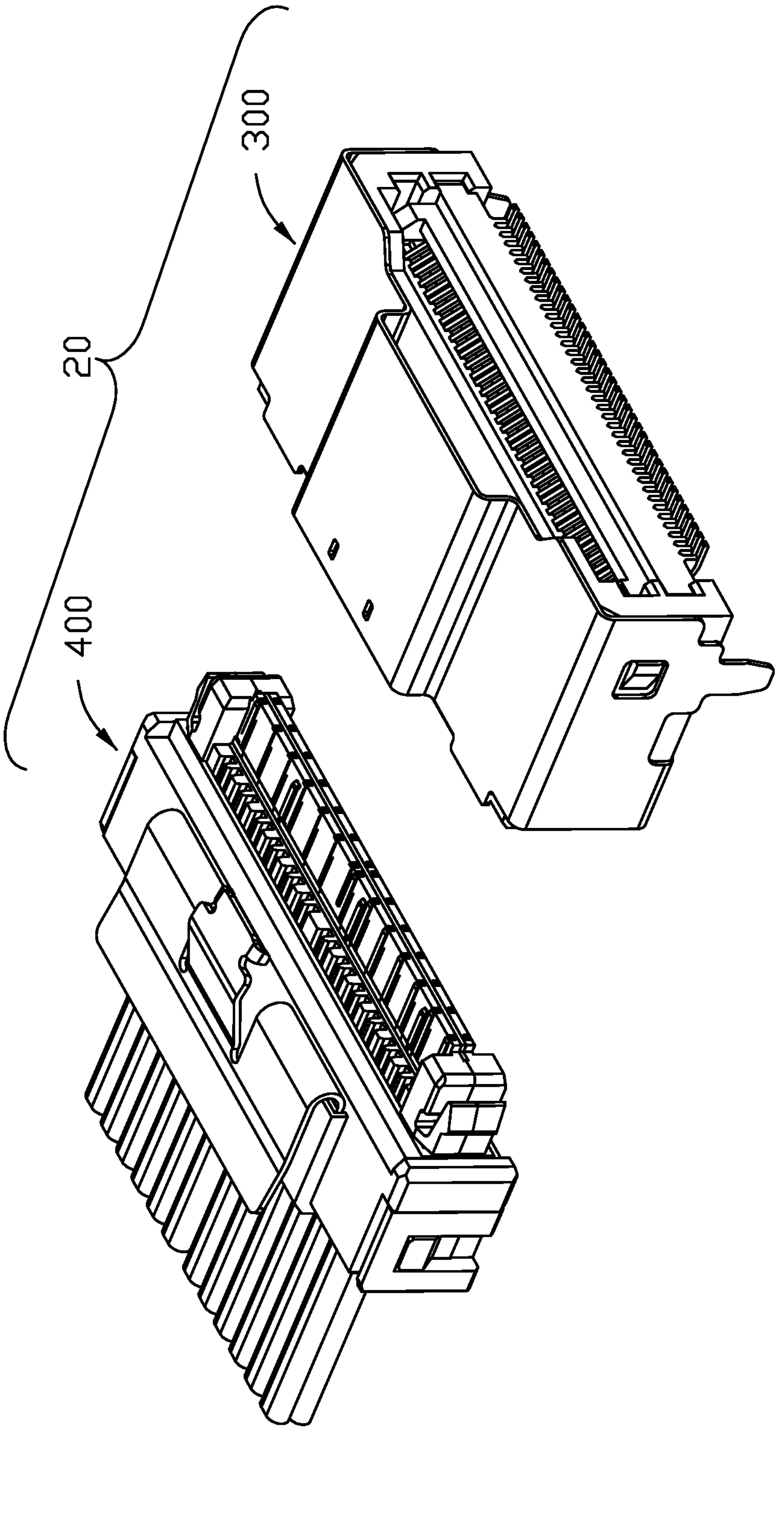
FIG. 19(B) is another perspective view of the electrical connector assembly of FIG. 19(A)
Figure 19C:
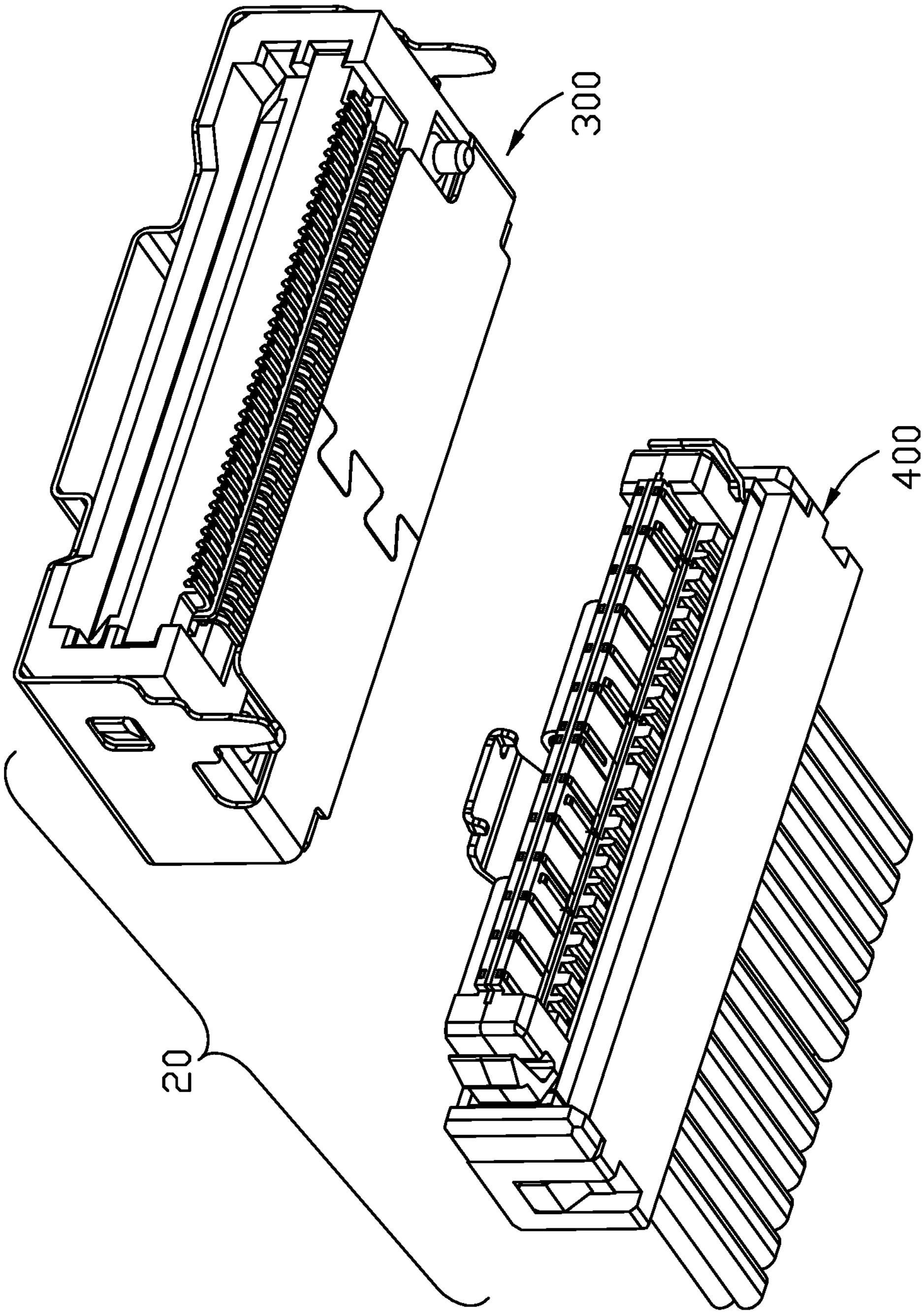
FIG. 19(C) is another exploded perspective view of the receptacle contact module of the electrical connector assembly of FIG. 19 (A) without showing the PCB.
Figure 20A:
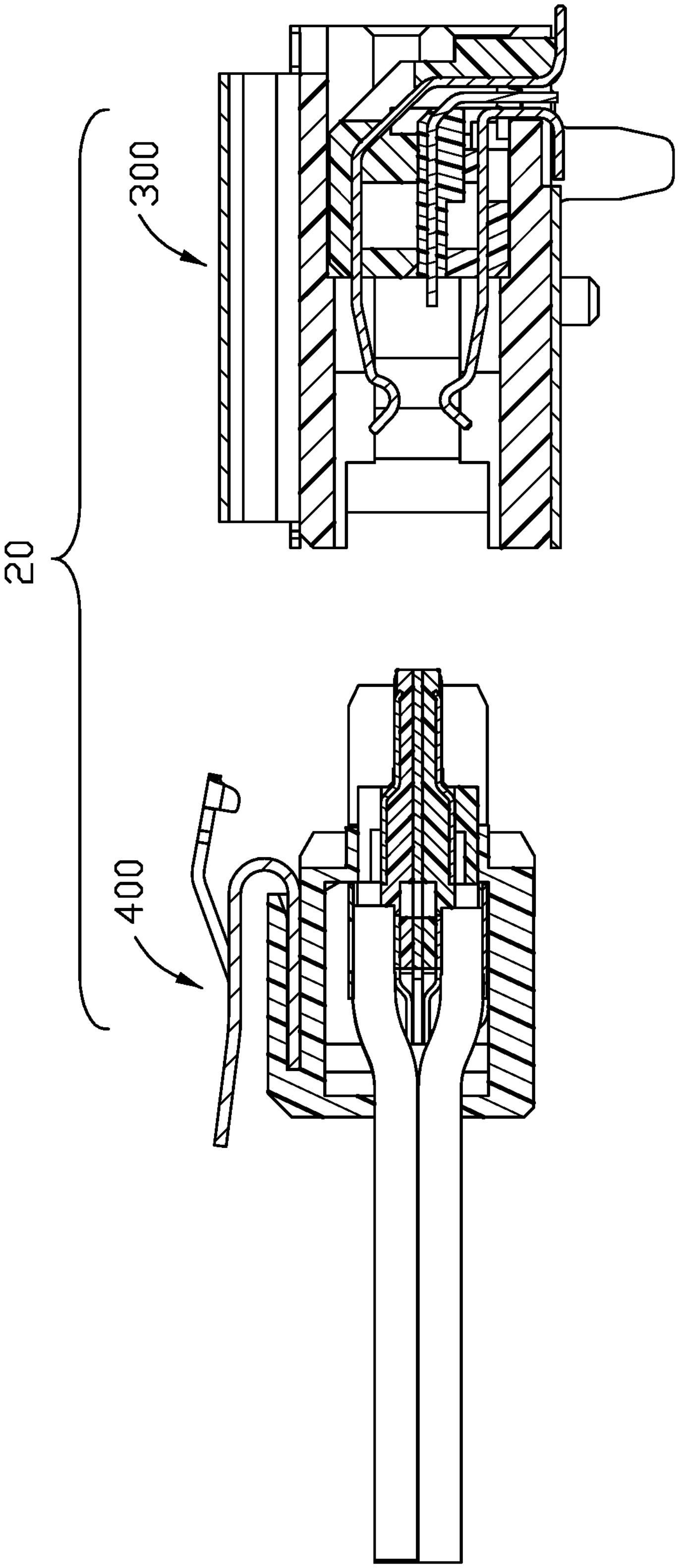
FIG. 20(A) is a cross-sectional view of the electrical connector assembly of FIG. 18(A) without showing the printed circuit board.
Figure 20B:
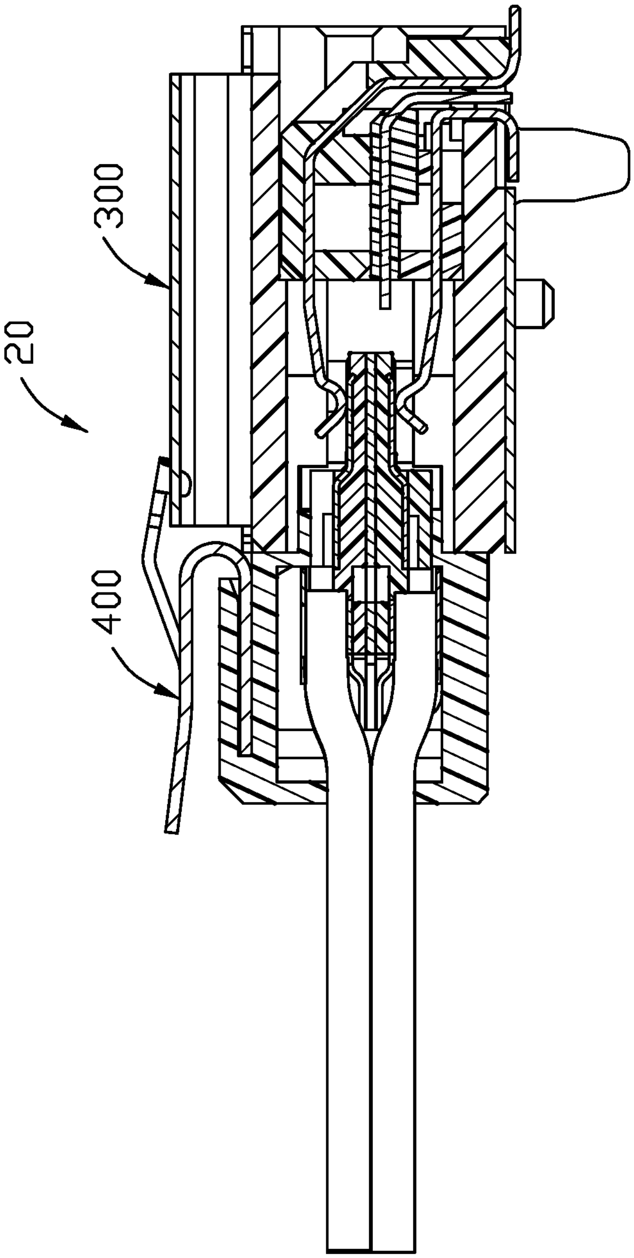
FIG. 20(B) is another cross-sectional view of the electrical connector assembly of FIG. 18(A)
Figure 21A:
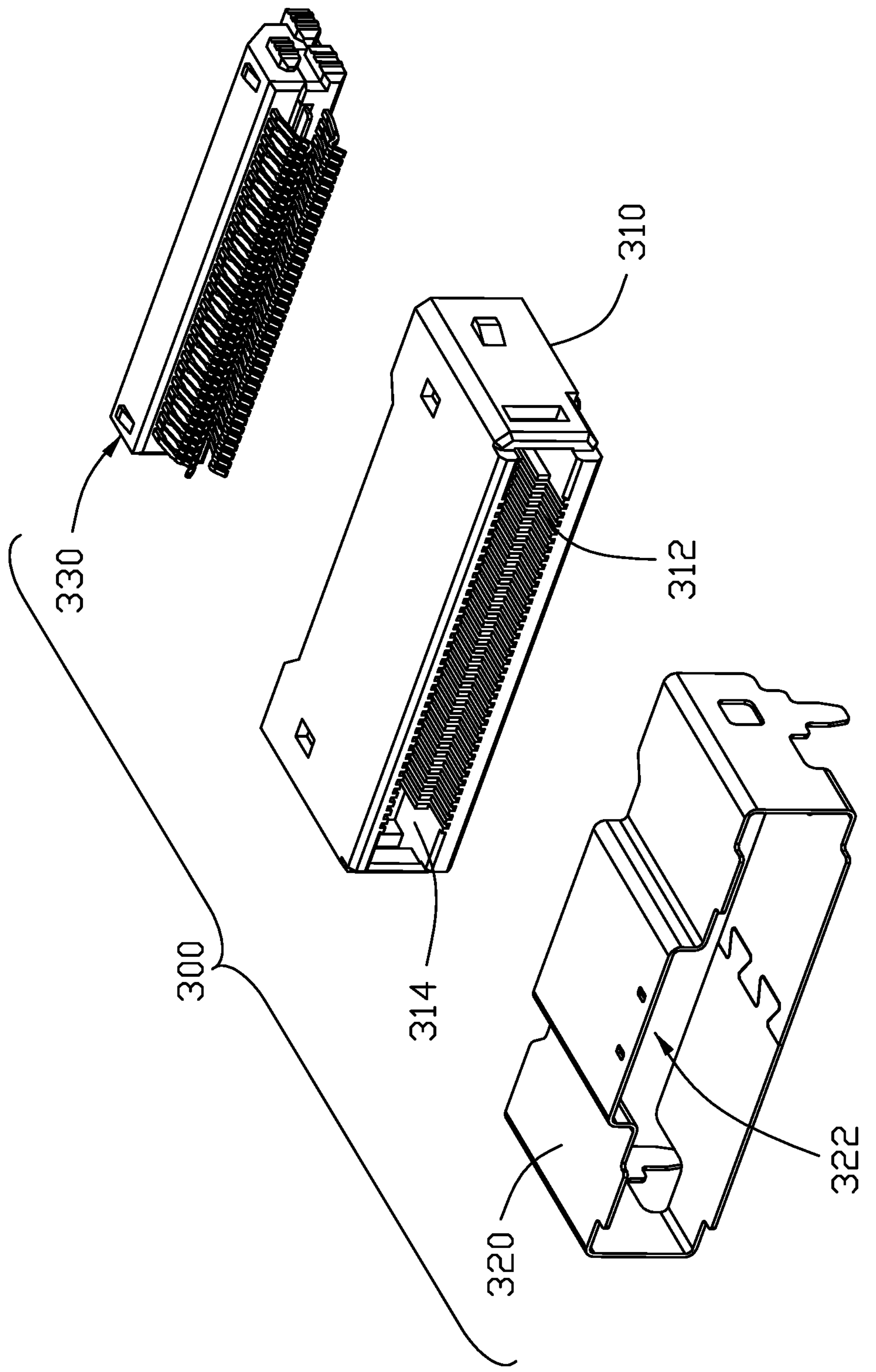
FIG. 21(A) is an exploded perspective view of the receptacle connector of the electrical connector assembly of FIG. 18(A) without showing the printed circuit board.
Figure 21B:
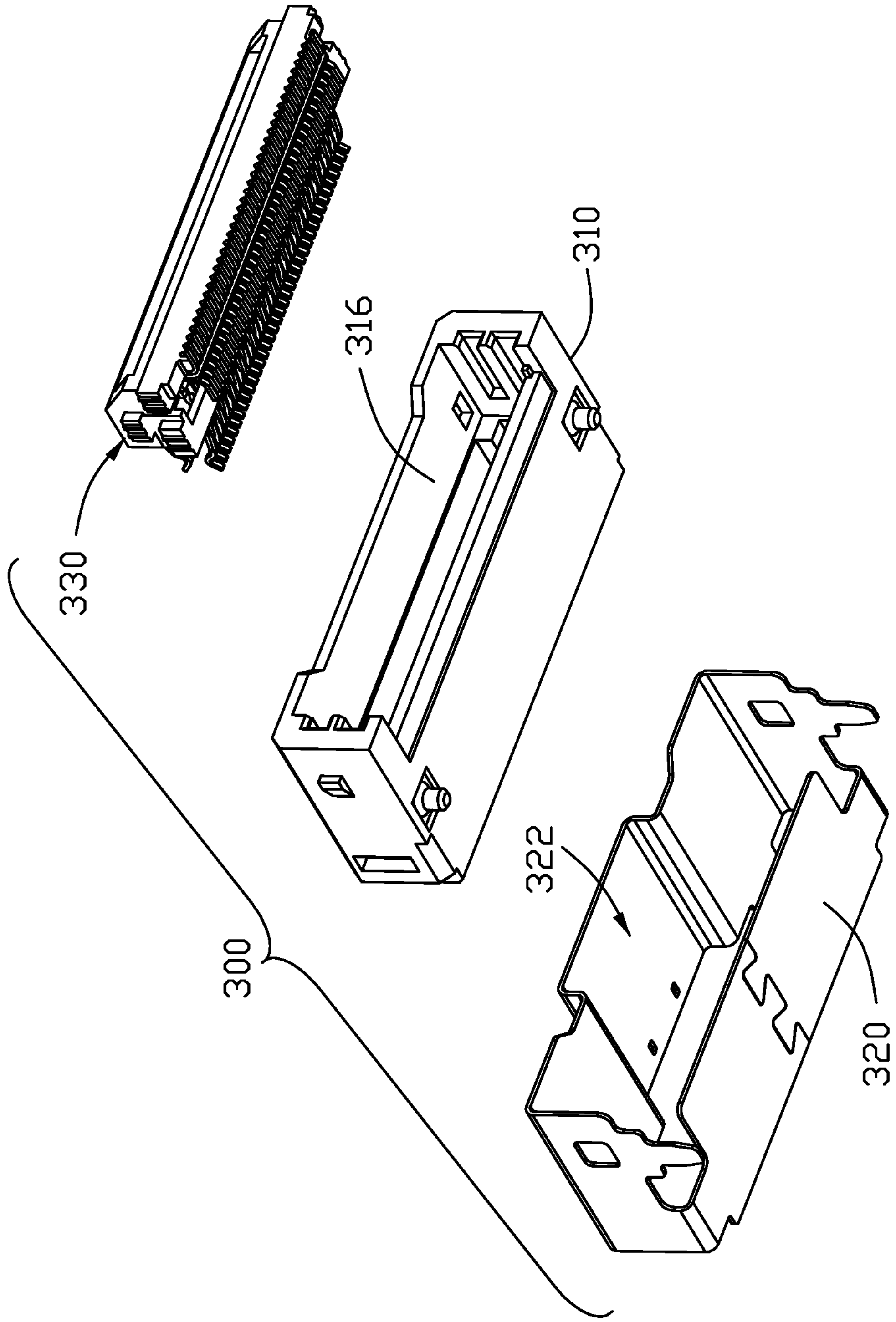
FIG. 21(B) is another exploded perspective view of the receptacle connector of the electrical connector assembly of FIG. 21(A)
Figure 22A:
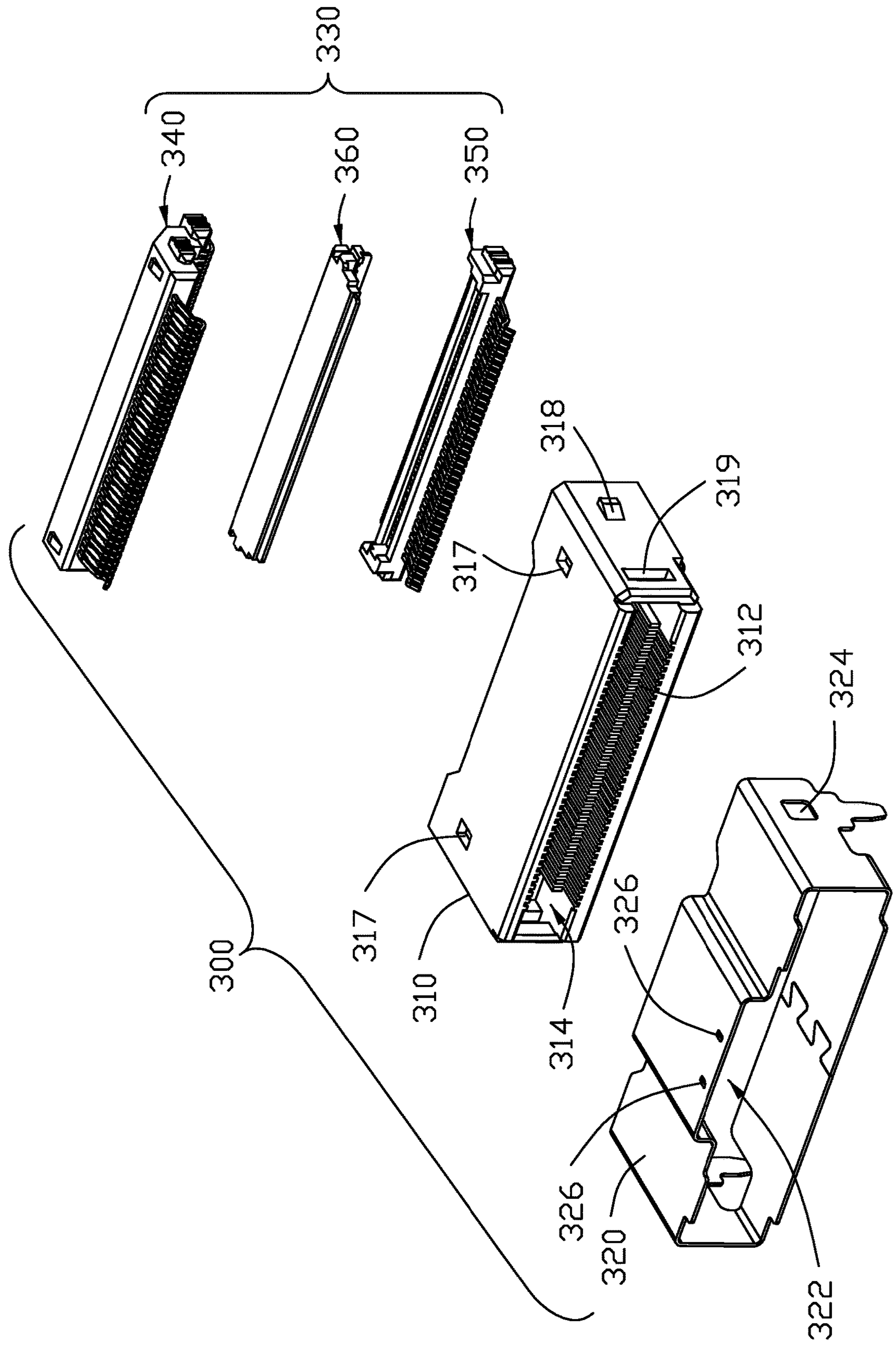
FIG. 22(A) is another exploded perspective view of the receptacle connector of the electrical connector assembly of FIG. 21(A)
Figure 22B:
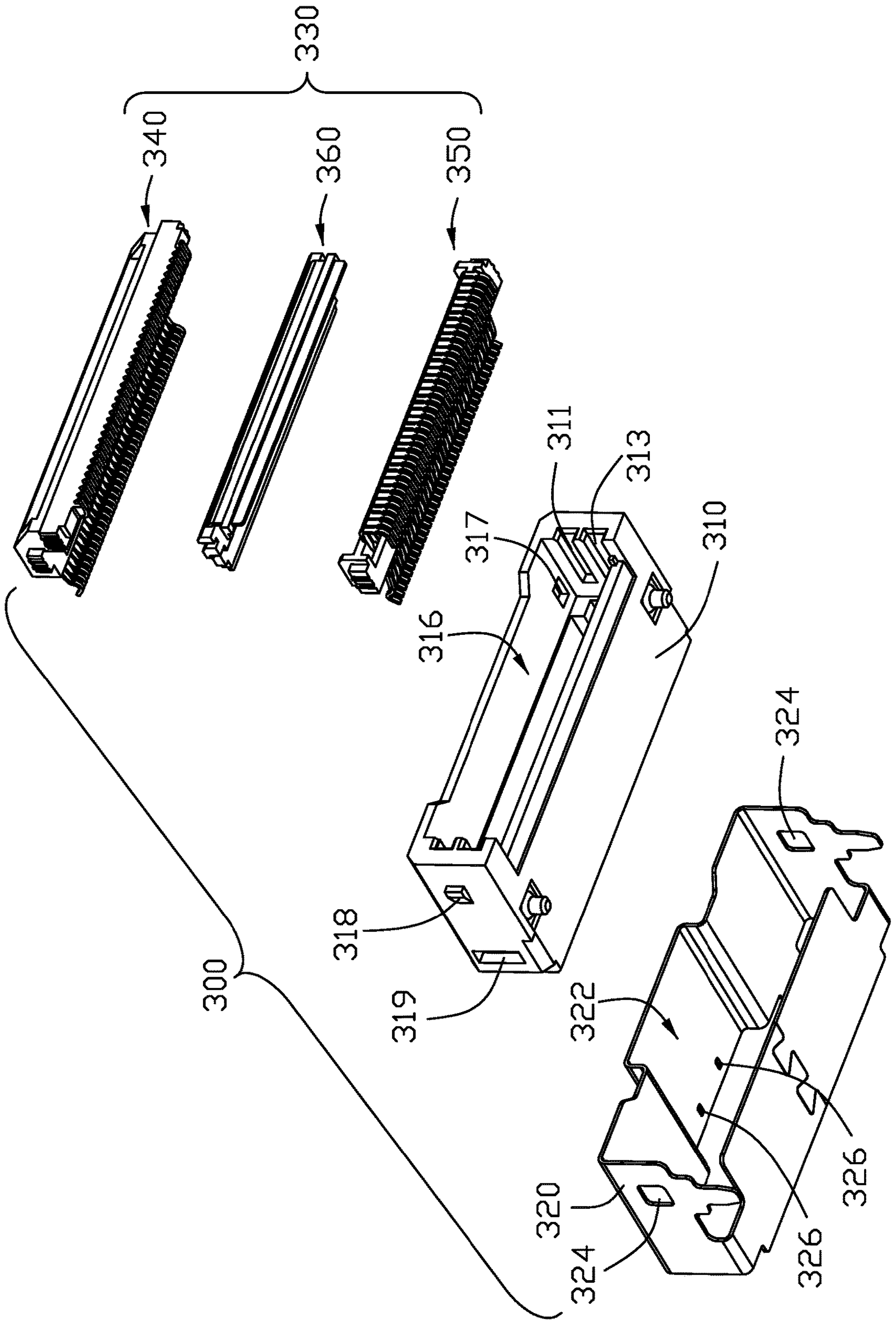
FIG. 22(B) is another exploded perspective view of the receptacle connector of the electrical connector assembly of FIG. 22(A)
Figure 22C:
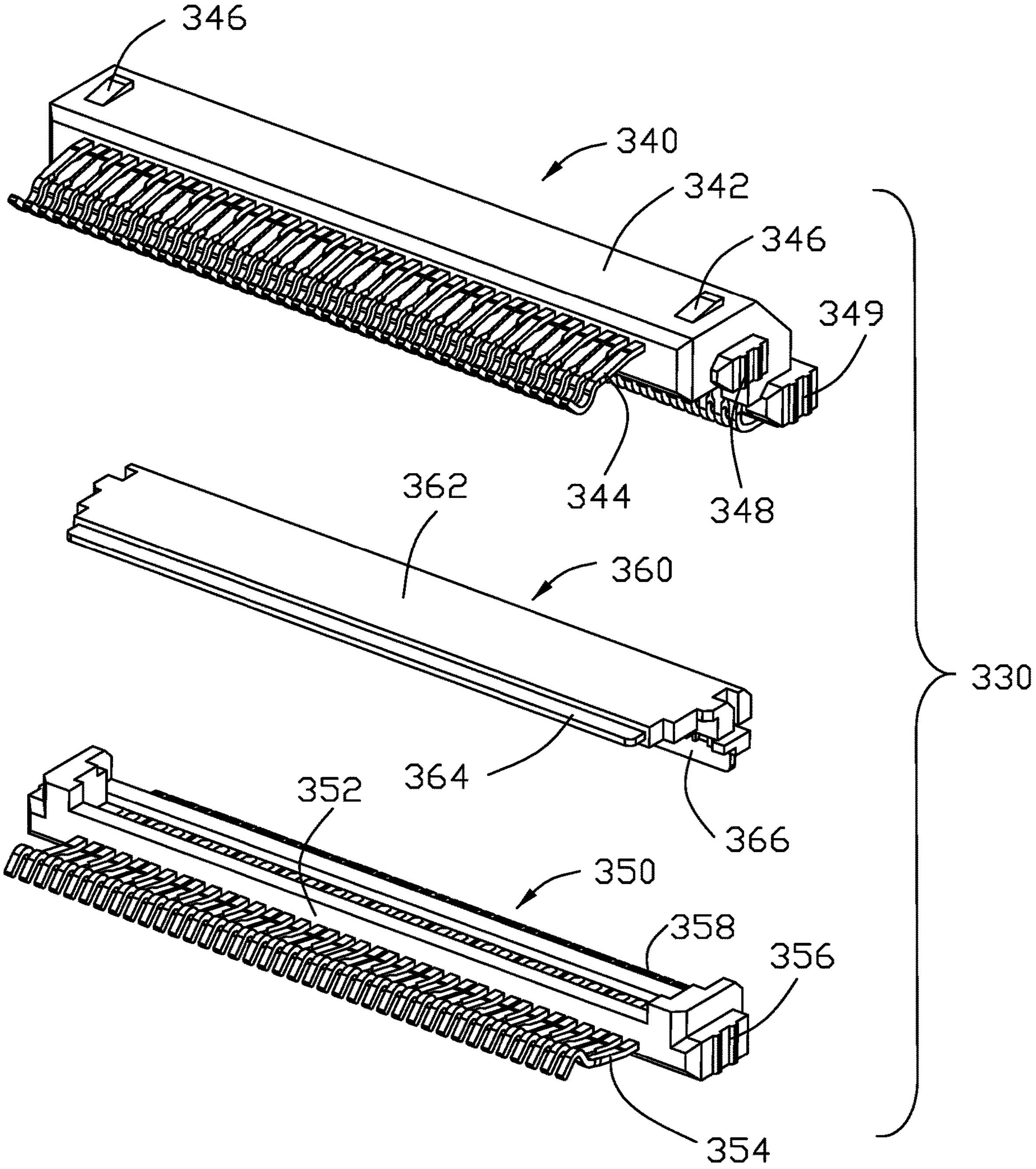
FIG. 22(C) is a partially exploded perspective view of the receptacle connector of the electrical connector assembly of FIG. 21(A)
Figure 22D:
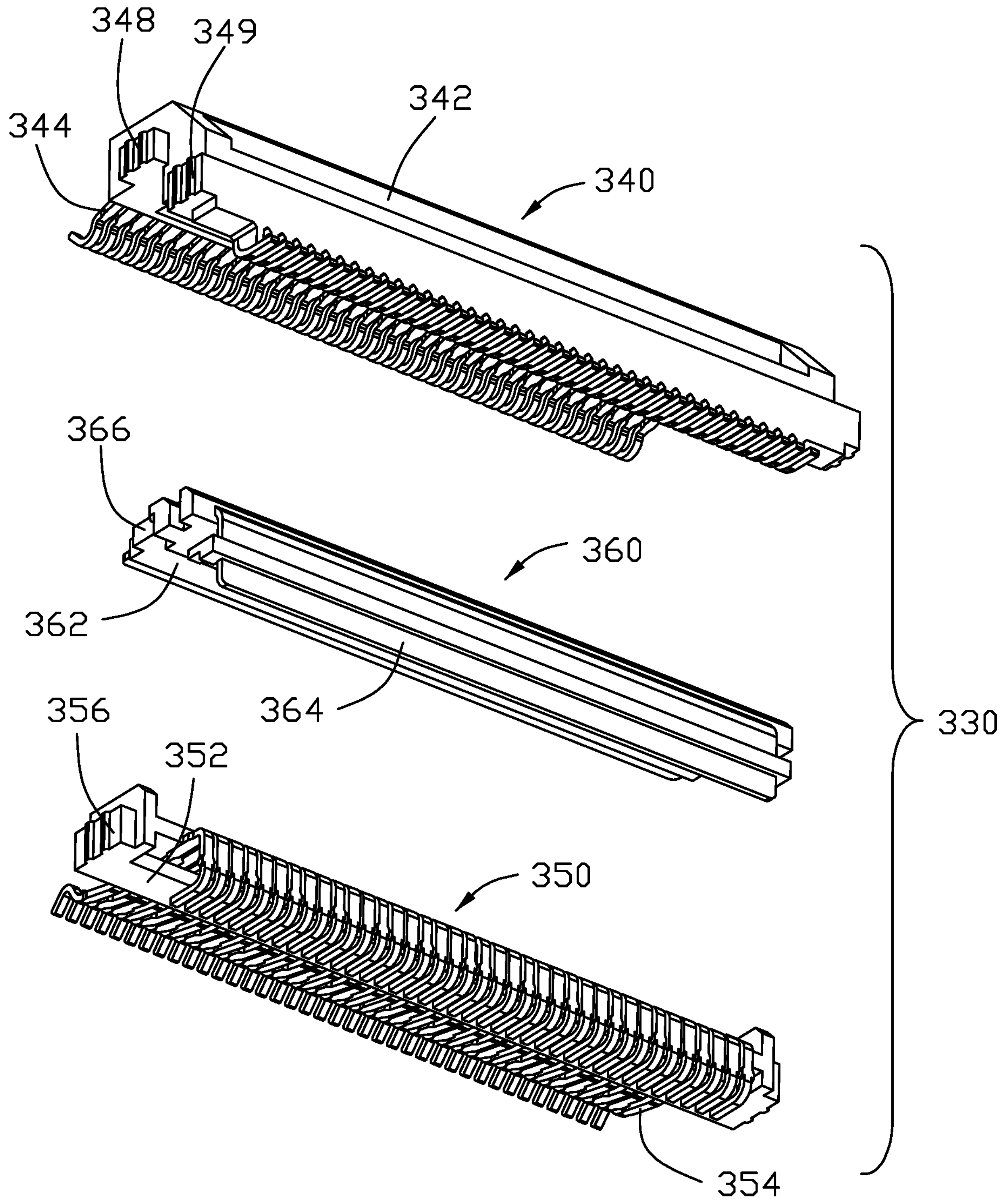
FIG. 22(D) is another exploded perspective view of the receptacle connector of the electrical connector assembly of FIG. 22(C)
Figure 23A:
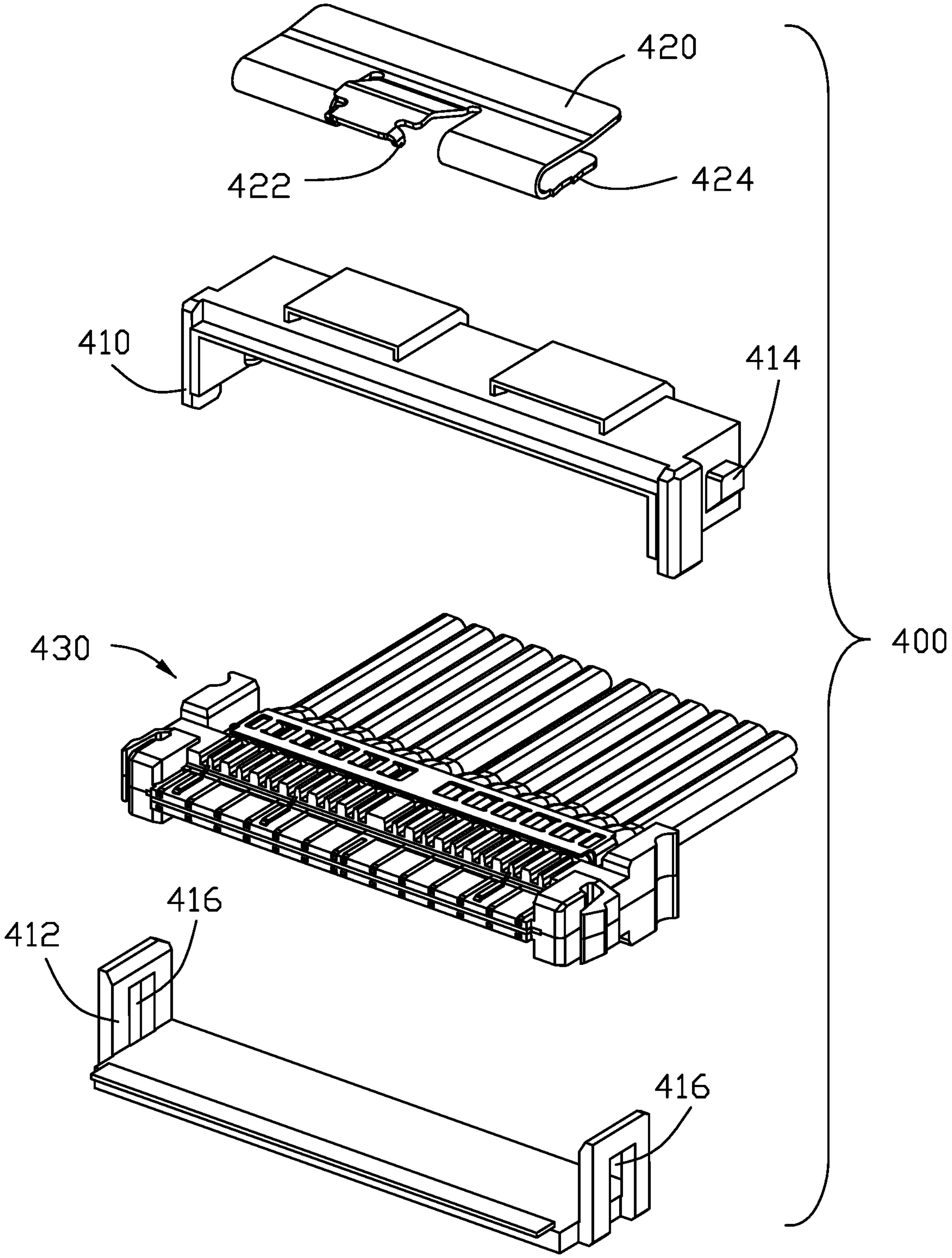
FIG. 23(A) is an exploded perspective view of the plug connector of the electrical connector assembly of FIG. 19(A)
Figure 23B:
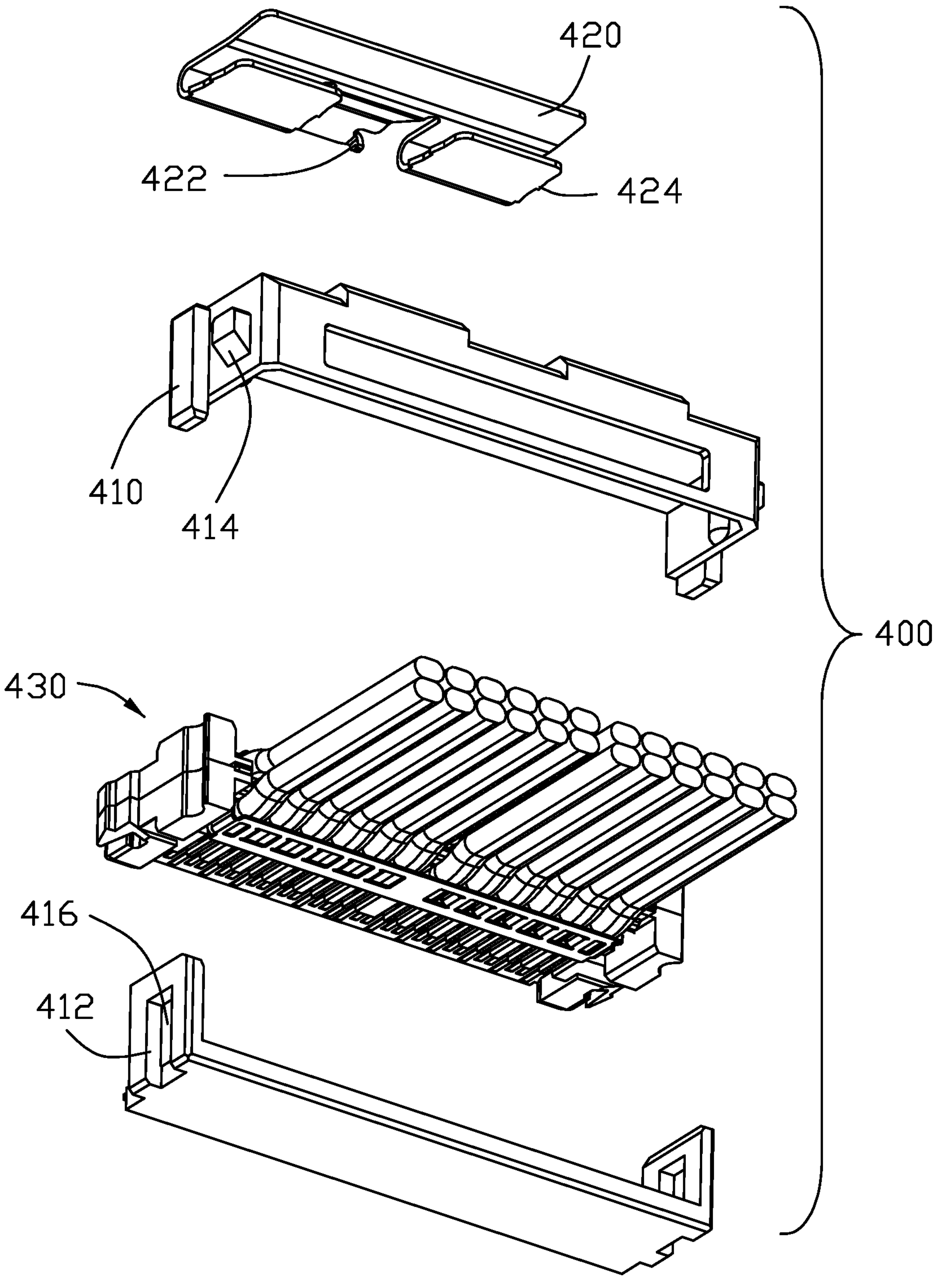
FIG. 23(B) is another exploded perspective view of the plug connector of the electrical connector assembly of FIG. 23(A)
Figure 24A:
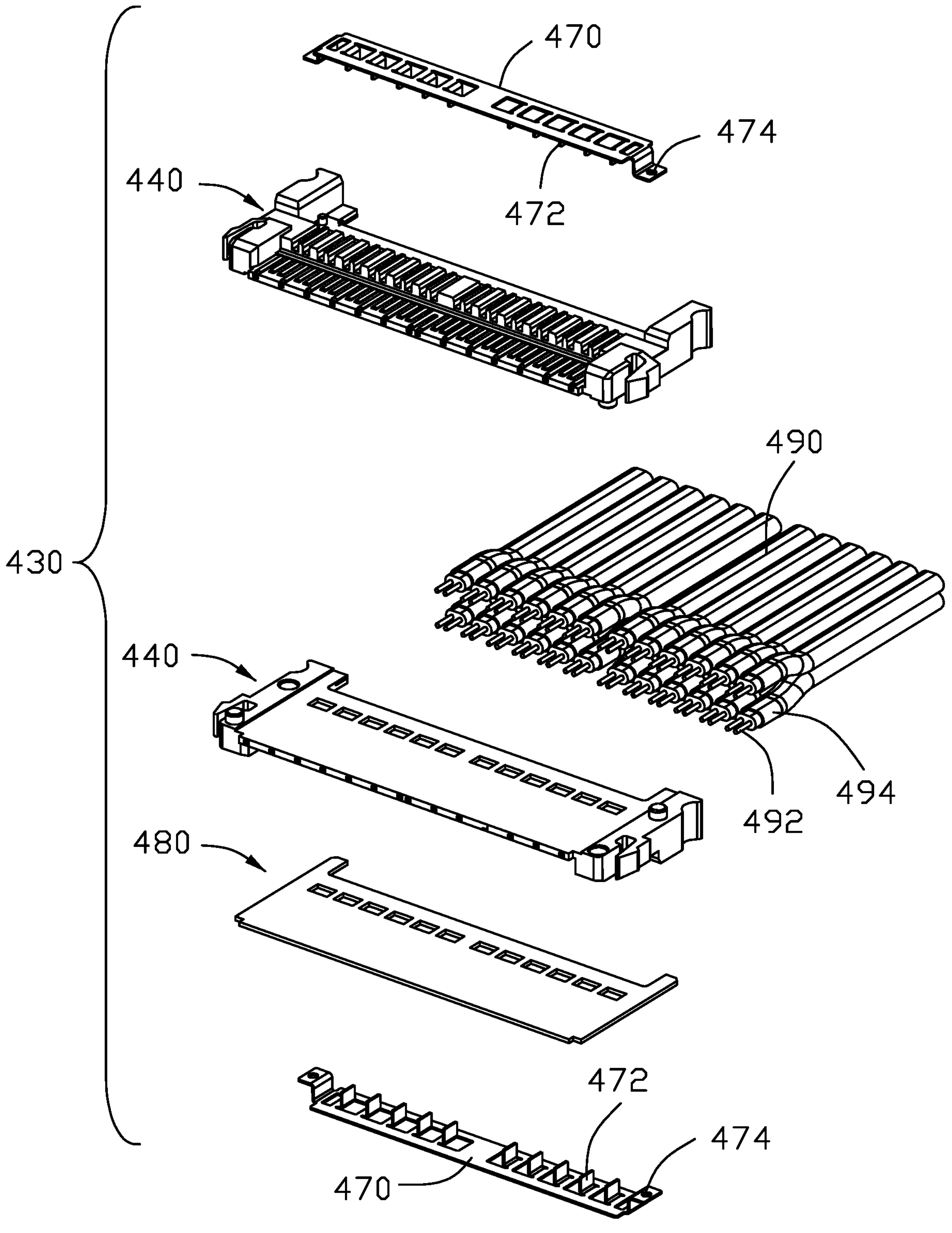
FIG. 24(A) is a further exploded perspective view of the plug connector of the electrical connector assembly of FIG. 23(A)
Figure 24B:
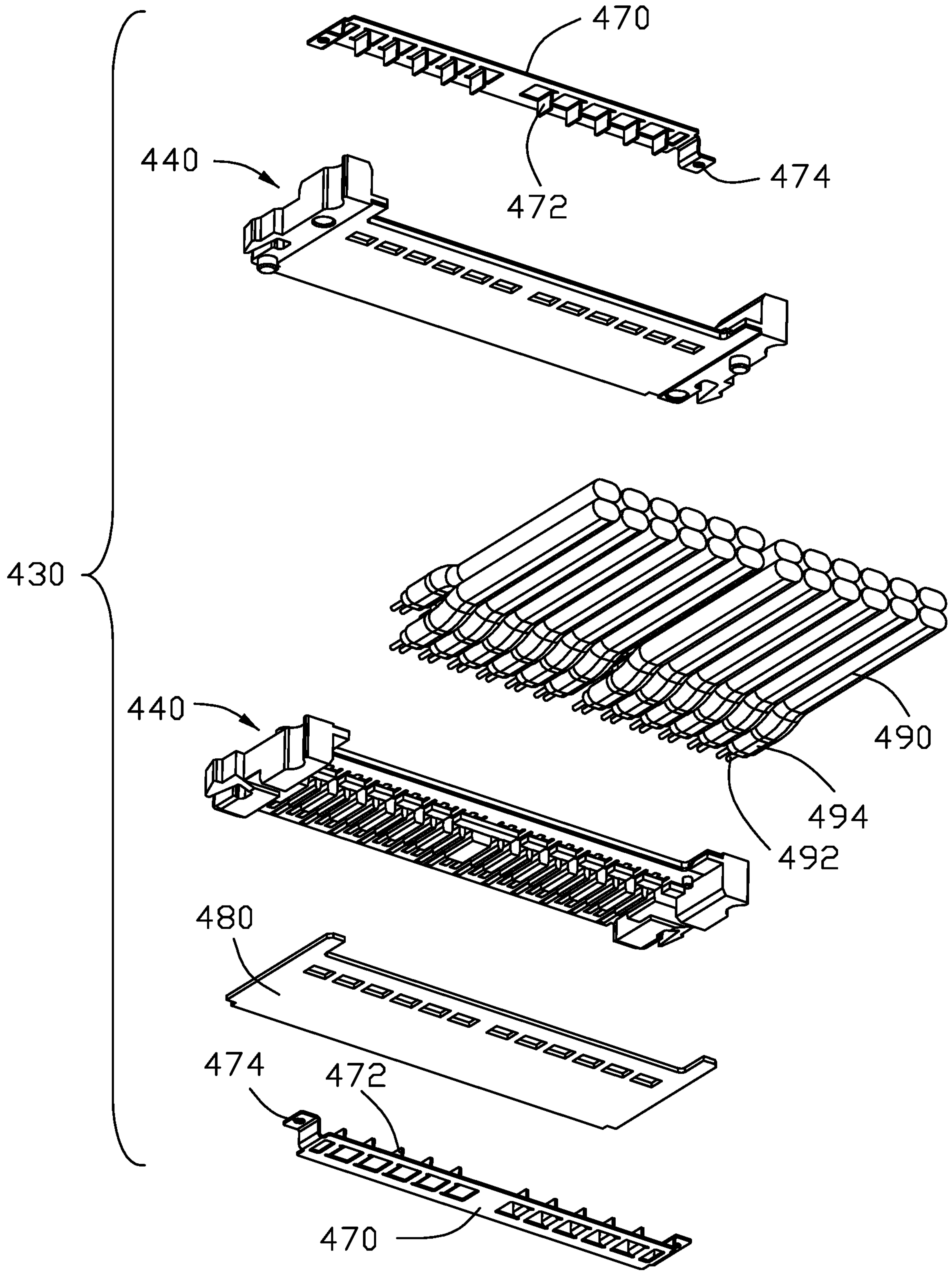
FIG. 24(B) is another exploded perspective view of the plug connector of the electrical connector assembly of FIG. 24(A)
Figure 25A:
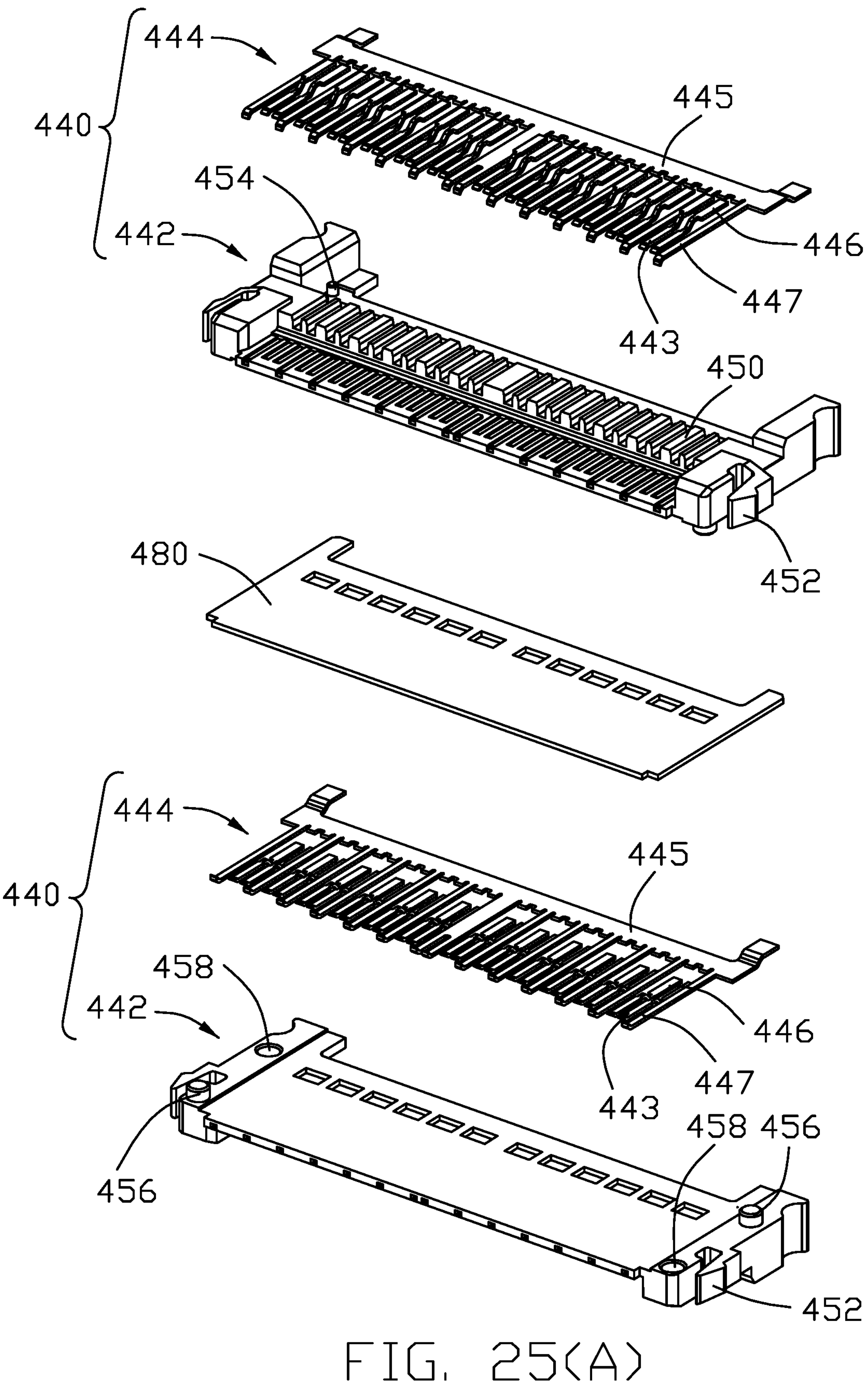
FIG. 25(A) is a further exploded perspective view of the plug connector of the electrical connector assembly of FIG. 24(A)
Figure 25B:
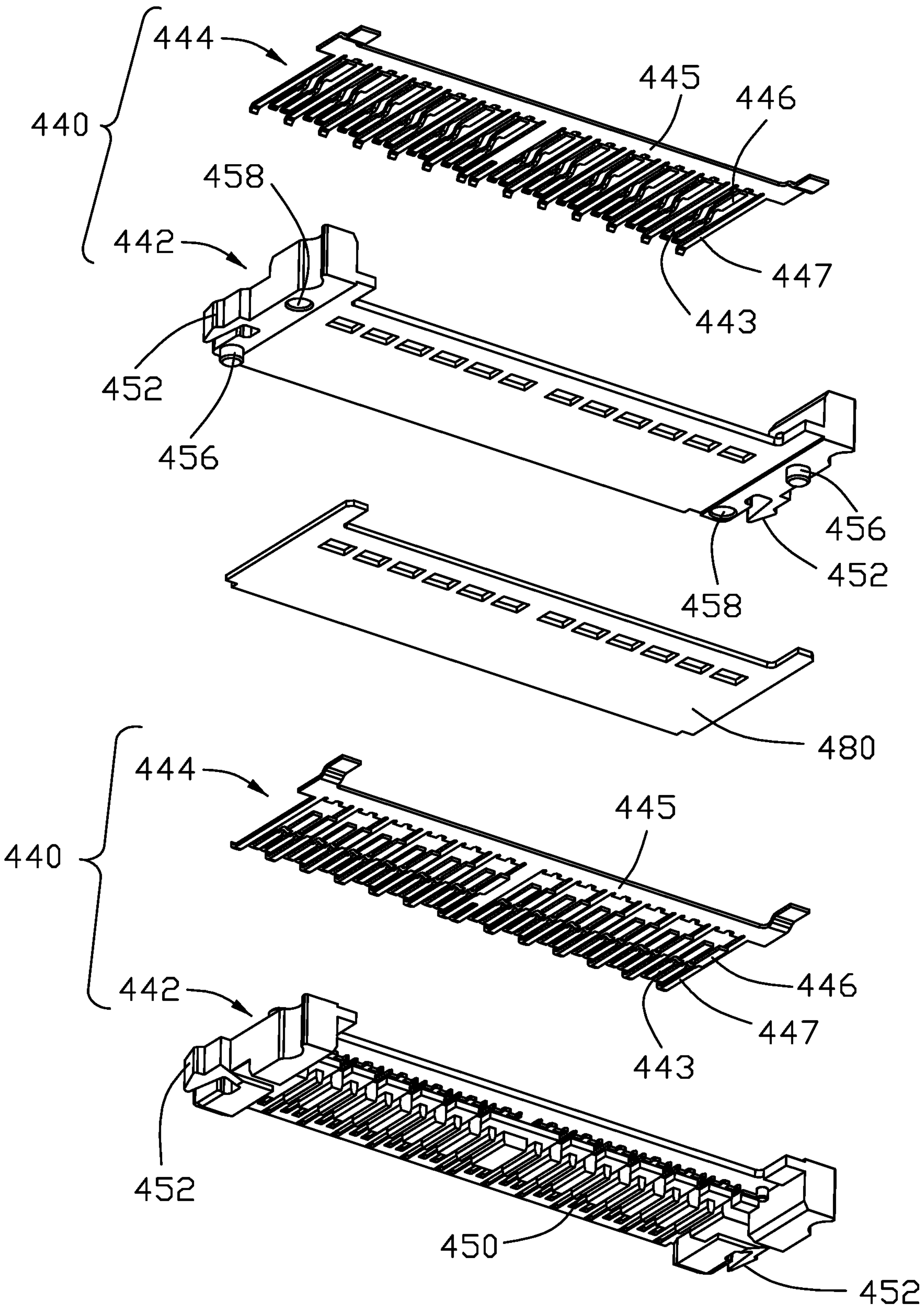
FIG. 25(B) is another exploded perspective view of the plug connector of the electrical connector assembly of FIG. 25(A).

FIGS. 15(A) to 17(B) illustrating a plug/cable connector 200 of a second embodiment, which is similar to the first embodiment. Please note the elements of the second embodiment same to that of the first embodiment share same numerals and the description of the same elements are omitted. The opening 281 in FIG. 15(A) is surrounded with an upper rib 2811, while the opening 281 in FIG. 4(A) opens upwards.

Referring to FIGS. 18(A)-26(B), an electrical connector assembly 20 includes a plug connector 400 and a receptacle connector 300 mated with each other in a horizontal/front-to-back direction. The receptacle connector 300 includes a contact module 330 retained in an insulative housing 310, and a metallic shield 320 encloses the housing 310. The housing 310 forms a mating cavity 314 to receive the mating portion (not labeled) of the contact module 430 of the plug connector 400. A plurality of passageways 312 are located beside the mating cavity 312. A receiving space 316 is formed in a rear portion of the housing 310 and communicates with the mating cavity 314. A pair of channels 311 and 313 are formed in the housing 310 for engagement with the protrusions 348 of the subunit 340 and the protrusion 356/349 of the subunit 350/340. A pair of locking openings 319 are formed in opposite end walls for engagement with the corresponding locking fingers 452 of the subunits 440 of the contact module 430 of the plug connector 400. A pair of protrusions 318 are formed on opposite ends for engagement within the corresponding openings 324 in the shield 320. A pair of opening 317 are formed in the two wall for receiving the corresponding protrusions 346 formed on the subunit 340 of the contact module 330. The shield 320 includes a locking space 322 to receive the latch 420 of the plug connector 400 with a pair of locking slits 326 to receive the pair of hooks 422 of the latch 420. The contact module 330 includes a pair of subunits 340, 350 commonly sandwiching a grounding unit 360 therebetween. The upper subunit 340 includes a plurality of contacts 344 integrally formed within an insulator 342 on which the protrusions 346, 349 are formed. The lower subunit 350 includes a plurality of contacts 354 are integrally formed within an insulator 352. A recessed structure 358 is formed in a rear side of the lower subunit 352. The grounding unit 360 includes a metallic shielding plate 366 integrally formed within an insulator 362.

The plug connector 400 includes a contact module 430 enclosed within a space defined by a pair of covers 410, 412. The cover 410 forms a pair of protrusions 414 engaged within the corresponding holes 416. The latch 420 includes a pair of retaining arms 424 retained to the cover 410, and a locking arm 422 with corresponding hooks 422 at a free end. The contact module 430 includes a pair of subunits 440 commonly sandwiching a metallic shielding plate 480 therebetween. Each subunit 440 includes a set of contacts 444 integrally formed within an insulator 442 via insert-molding. The set of contacts includes a plurality of grounding contacts 447 and a plurality of differential pair contacts 443 alternately arranged with each other along the longitudinal direction. All grounding contacts 446 are unified together with a transverses bar 445. The soldering sections 446 of the differential pair contacts 443 are soldered with the inner conductors 492 of the wires 490. The insulator 442 includes a plurality of partitions 450 forming corresponding grooves to receive the soldering sections 446 of the differential pair contacts 443 and the inner conductors 492 of the wires 490. The insulator 442 includes posts 456 and holes 458 so as to be coupled with the holes 458 and the posts 456 of the other insulator 442. A pair of locking fingers 452 are formed on two opposite ends of the insulator 442 in the longitudinal direction. A pair of grounding bars 470 are attached to the corresponding insulator 442. Each grounding bar 470 forms a pair of holes 474 to receive the corresponding posts 454 of the insulator 442, and a plurality of tabs 472 beside corresponding openings so as to have the shielding/braiding layers 492 soldered with the corresponding tabs 472 and the transverse bar 445.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A cable connector comprising:

a contact module including a metallic shielding plate and a pair of subunits commonly sandwiching the metallic shielding plate in a transverse direction;

each subunit comprising a plurality of contacts integrally formed within an insulator, the contacts including a plurality of differential-pair contacts and grounding contacts alternately arranged with each other in a longitudinal direction perpendicular to the transverse direction, each contact comprising a front contacting section and a rear tail section along a mating direction perpendicular to both the transverse direction and the longitudinal direction, the tail sections of the grounding contacts being unified with a transverse bar;

a plurality of wires each having a pair of inner conductors respectively soldered to the tail sections of corresponding differential-pair contacts, and an outer braiding layer surrounding the pair of inner conductors and mechanically and electrically connected to the transverse bar; and a pair of grounding bars positioned upon corresponding subunits, respectively, each grounding bar including a plurality of rear tabs respectively connected to the braiding layers, and a plurality of front tabs respectively connected to the tail sections of corresponding grounding contacts.

2. The cable connector as claimed in claim 1, wherein each rear tab extends in both the mating direction and the transverse direction, and each front tab extends in both the mating direction and the transverse direction.

3. The cable connector as claimed in claim 2, wherein each rear tab separates the braiding layers of the two corresponding neighboring wires in the longitudinal direction, and each front tab separates the inner conductors of the two neighboring wires in the longitudinal direction.

4. The cable connector as claimed in claim 3, wherein the insulator of each subunit further includes a plurality of partitions to separate the two tail sections of the corresponding pair of differential-pair contacts internally in the longitudinal direction.

5. The cable connector as claimed in claim 3, wherein the braiding layer is sandwiched between the transverse bar and the corresponding grounding bar in the transverse direction.

6. A cable connector comprising:

a contact module including a metallic shielding plate and a pair of subunits commonly sandwiching the metallic shielding plate in a transverse direction;

each subunit comprising a plurality of contacts integrally formed within an insulator, the contacts including a plurality of differential-pair contacts and grounding contacts alternately arranged with each other in a longitudinal direction perpendicular to the transverse direction, each contact comprising a front contacting section and a rear tail section along a mating direction perpendicular to both the transverse direction and the longitudinal direction, the tail sections of the grounding contacts being unified with a transverse bar;

a plurality of wires each having a pair of inner conductors respectively soldered to the tail sections of corresponding differential-pair contacts, and an outer braiding layer surrounding the pair of inner conductors and mechanically and electrically connected to the transverse bar; and a pair of grounding bars positioned upon corresponding subunits, respectively, each grounding bar comprising a plurality of rear tabs to separate respective braiding layers of the two corresponding neighboring wires in the longitudinal direction, and a plurality of front tabs respectively separating the inner conductors of the two corresponding neighboring wires in the longitudinal direction.

7. The cable connector as claimed in claim 6, wherein the front tabs connect to the tail sections of the corresponding grounding contacts in the transverse direction.

8. The cable connector as claimed in claim 6, wherein each rear tab extends in both the mating direction and the transverse direction, and each front tab extends in both the mating direction and the transverse direction.

* * * * *